United States Patent
Sun et al.

(10) Patent No.: US 11,397,484 B2
(45) Date of Patent: Jul. 26, 2022

(54) DISPLAY PANEL, DISPLAY DEVICE AND METHOD FOR DETERMINING THE POSITION OF AN EXTERNAL OBJECT THEREBY

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Shicheng Sun, Beijing (CN); Shuang Hu, Beijing (CN); Peirong Huo, Beijing (CN); Jianfei Tian, Beijing (CN); Zhiqiang Wang, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 215 days.

(21) Appl. No.: 16/759,641

(22) PCT Filed: Sep. 25, 2019

(86) PCT No.: PCT/CN2019/107647
§ 371 (c)(1),
(2) Date: Apr. 27, 2020

(87) PCT Pub. No.: WO2020/063608
PCT Pub. Date: Apr. 2, 2020

(65) Prior Publication Data
US 2020/0294752 A1   Sep. 17, 2020

(30) Foreign Application Priority Data
Sep. 26, 2018   (CN) .......................... 201811124934.0

(51) Int. Cl.
G06F 3/041   (2006.01)
G06F 3/042   (2006.01)

(52) U.S. Cl.
CPC .......... *G06F 3/0412* (2013.01); *G06F 3/0421* (2013.01)

(58) Field of Classification Search
CPC ..... G06F 3/0412; G06F 3/0421; H01L 27/323
See application file for complete search history.

(56) References Cited

U.S. PATENT DOCUMENTS 5,453,611 A * 9/1995 Oozu ................ H01L 27/14621
                                                         250/208.1
2011/0043487 A1 * 2/2011 Huang ................. H01L 27/323
                                                          345/175
(Continued)

FOREIGN PATENT DOCUMENTS

CN   101887691   11/2010
CN   206541596   10/2017
(Continued)

OTHER PUBLICATIONS

Office action from Chinese Application No. 201811124934.0 dated May 8, 2020.
(Continued)

*Primary Examiner* — Patrick N Edouard
*Assistant Examiner* — Joseph P Fox
(74) *Attorney, Agent, or Firm* — Calfee, Halter & Griswold LLP

(57) ABSTRACT

The present disclosure provides a display panel including at least one pixel region located in a display area, each pixel region includes: at least one first pixel including at least one display light-emitting sub-pixel and at least one near-infrared light-emitting sub-pixel, wherein the near-infrared light-emitting sub-pixel is configured to emit near-infrared light;

(Continued)

and at least one second pixel including at least one display light-emitting sub-pixel and at least one near-infrared receiving sub-pixel, wherein the near-infrared receiving sub-pixel is configured to receive near-infrared light reflected from an external object and generate a measurement signal responsive to the external object. The present disclosure also provides a display device including the display panel, and a method for determining the position of an external object by the display device.

14 Claims, 10 Drawing Sheets

(56) References Cited

U.S. PATENT DOCUMENTS

| | | | | |
|---|---|---|---|---|
| 2012/0126204 | A1* | 5/2012 | So | H01L 51/426 257/21 |
| 2014/0198067 | A1* | 7/2014 | Jeon | G06F 3/0412 345/173 |
| 2017/0371462 | A1* | 12/2017 | Kim | G06V 40/1306 |
| 2020/0294752 | A1 | 9/2020 | Sun et al. | |

FOREIGN PATENT DOCUMENTS

| | | |
|---|---|---|
| CN | 107785400 | 3/2018 |
| CN | 108054190 | 5/2018 |
| CN | 109360838 | 2/2019 |
| JP | 2016-174028 | 9/2016 |

OTHER PUBLICATIONS

International Search Report from PCT/CN2019/107647 dated Dec. 24, 2019.

* cited by examiner

US 11,397,484 B2

DISPLAY PANEL, DISPLAY DEVICE AND METHOD FOR DETERMINING THE POSITION OF AN EXTERNAL OBJECT THEREBY

RELATED APPLICATIONS

The present application is a 35 U.S.C. 371 national stage application of PCT International Application No. PCT/CN2019/107647, filed on Sep. 25, 2019, which claims the benefit of Chinese Patent Application for Invention No. 201811124934.0 titled "Inductive Control Display Panel and Inductive Control Display Device" and filed on Sep. 26, 2018, the entire disclosures of which are incorporated herein by reference.

TECHNICAL FIELD

The present disclosure relates to the field of display technologies, and particularly to a display panel, a display device comprising the display panel and a method for determining the position of an external object by the display device.

BACKGROUND

With the constant development of display technologies, more and more additional functions are integrated into a display device. From initial push-button mobile phones to today's smart touch screen mobile phones, the human-computer interaction mode has changed dramatically, and the inductive control interaction mode is very likely to become the next generation of human-computer interaction mode.

The existing inductive control interaction mode mainly comprises voice control, optical sensing and the like, while an inductive control interaction mode using near-infrared emission and near-infrared reception is mainly applied to a distance sensor. However, at present, the distance sensor which uses near-infrared emission and near-infrared reception for distance detection in the display device needs to occupy a certain space as a separate module, and can only realize the single function of distance detection.

SUMMARY

According to an aspect of the present disclosure, there is provided a display panel, including at least one pixel region located in a display area, each pixel region including: at least one first pixel including at least one display light-emitting sub-pixel and at least one near-infrared light-emitting sub-pixel, wherein the near-infrared light-emitting sub-pixel is configured to emit near-infrared light; and at least one second pixel including at least one display light-emitting sub-pixel and at least one near-infrared receiving sub-pixel, wherein the near-infrared receiving sub-pixel is configured to receive near-infrared light reflected from an external object and generate a measurement signal accordingly.

According to some exemplary embodiments of the present disclosure, the display light-emitting sub-pixel includes an organic light-emitting diode, and the near-infrared light-emitting sub-pixel includes a near-infrared organic light-emitting diode.

According to some exemplary embodiments of the present disclosure, the near-infrared organic light-emitting diode includes an anode, a hole transport layer, an electron blocking layer, a near-infrared light-emitting layer, a hole blocking layer, an electron transport layer and a cathode laminated sequentially.

According to some exemplary embodiments of the present disclosure, the near-infrared receiving sub-pixel includes a PN junction semiconductor, a voltage supply signal line, an inductive control signal line and a light filtering film; the N-type semiconductor in the PN junction semiconductor is connected with the voltage supply signal line, the P-type semiconductor in the PN junction semiconductor is connected with the inductive control signal line; and the light filtering film is arranged on the side of a light receiving surface of the PN junction semiconductor, and the light filtering film only allows the transmission of near-infrared light.

According to some exemplary embodiments of the present disclosure, the near-infrared receiving sub-pixel further includes a buffer layer, a gate insulating layer, an interlayer dielectric layer, a planarization layer and a pixel defining layer sequentially formed on a substrate; the PN junction semiconductor is formed on the buffer layer, the voltage supply signal line is formed on the interlayer dielectric layer, and the inductive control signal line is formed on the planarization layer.

According to some exemplary embodiments of the present disclosure, the light filtering film is arranged on the light receiving surface of the PN junction semiconductor, and formed, at a position corresponding to the light filtering film, with a via hole passing through the pixel defining layer, the planarization layer, the interlayer dielectric layer and the gate insulating layer.

According to some exemplary embodiments of the present disclosure, the light filtering film is arranged on the pixel defining layer, and the orthographic projection of the light filtering film on the PN junction semiconductor covers the PN junction semiconductor.

According to some exemplary embodiments of the present disclosure, the display light-emitting sub-pixel and the near-infrared light-emitting sub-pixel both comprise a sub-pixel drive circuit including: a voltage signal terminal configured to receive a voltage signal; a gate line signal terminal configured to receive a gate line control signal; a light-emitting control signal terminal configured to receive a light-emitting control signal; a data signal terminal configured to receive a data signal; a reset signal terminal configured to receive a reset signal; an initialization signal terminal configured to receive an initialization signal; an output terminal configured to output an output signal; a first transistor having a control electrode connected with the reset signal terminal, a first electrode connected with the initialization signal terminal, and a second electrode connected with a first node; a second transistor having a control electrode connected with the gate line signal terminal, a first electrode connected with the first node, and a second electrode connected with a second node; a third transistor having a control electrode connected with the first node, a first electrode connected with a third node, and a second electrode connected with the second node; a fourth transistor having a control electrode connected with the gate line signal terminal, a first electrode connected with the data signal terminal, and a second electrode connected with the third node; a fifth transistor having a control electrode connected with the light-emitting control signal terminal, a first electrode connected with the voltage signal terminal, and a second electrode connected with the third node; a sixth transistor having a control electrode connected with the light-emitting control signal terminal, a first electrode connected with the second node, and a second electrode connected with the output terminal; a seventh transistor having a control electrode connected with the reset signal terminal, a first electrode connected with the initialization signal terminal, and a second electrode connected with the output terminal; and a capacitor having a first electrode connected with the voltage signal terminal, and a second electrode connected with the first node.

According to some exemplary embodiments of the present disclosure, the first pixel includes: a reset signal line configured to transmit the reset signal; a gate line configured to transmit the gate line control signal; an initialization signal line configured to transmit the initialization signal; a light-emitting control line configured to transmit the light-emitting control signal; a first voltage signal line configured to transmit a first voltage signal; a second voltage signal line configured to transmit a second voltage signal; a display data signal line configured to transmit a display data signal for the display light-emitting sub-pixel; a near-infrared data signal line configured to transmit a near-infrared data signal for the near-infrared light-emitting sub-pixel; wherein the reset signal terminal is connected to the reset signal line, the gate line signal terminal is connected to the gate line, the light-emitting control signal terminal is connected to the light-emitting control line, the initialization signal terminal is connected to the initialization signal line, and the voltage signal terminal is connected to the first voltage signal line; wherein the data signal terminal and the output terminal of the sub-pixel drive circuit of the near-infrared light-emitting sub-pixel are respectively connected to the near-infrared data signal line and the anode of the near-infrared organic light-emitting diode, wherein the data signal terminal and the output terminal of the sub-pixel drive circuit of the display light-emitting sub-pixel are respectively connected to the display data signal line and the anode of the organic light-emitting diode, and wherein the cathodes of the organic light-emitting diode and the near-infrared organic light-emitting diode are both connected to the second voltage signal line.

According to some exemplary embodiments of the present disclosure, the second pixel includes: a reset signal line configured to transmit the reset signal; a gate line configured to transmit the gate line control signal; an initialization signal line configured to transmit the initialization signal; a light-emitting control line configured to transmit the light-emitting control signal; a first voltage signal line configured to transmit a first voltage signal; a second voltage signal line configured to transmit a second voltage signal; a display data signal line configured to transmit a display data signal for the display light-emitting sub-pixel; wherein the reset signal terminal is connected to the reset signal line, the gate line signal terminal is connected to the gate line, the light-emitting control signal terminal is connected to the light-emitting control line, the initialization signal terminal is connected to the initialization signal line, and the voltage signal terminal is connected to the first voltage signal line; and wherein the data signal terminal and the output terminal of the sub-pixel drive circuit of the display light-emitting sub-pixel are respectively connected to the display data signal line and the anode of the organic light-emitting diode, and the cathode of the organic light-emitting diode is connected to the second voltage signal line.

According to some exemplary embodiments of the present disclosure, the voltage supply signal line is connected with a voltage signal terminal of a sub-pixel drive circuit of any display light-emitting sub-pixel in the second pixel, or with the first voltage signal line.

According to some exemplary embodiments of the present disclosure, in each pixel region, the number of the first pixels is one, and the number of the second pixels is eight, and wherein the first pixel and the second pixels are arranged in a 3×3 array, and the first pixel is located at the position where the second row and the second column of the 3×3 array intersect.

According to some exemplary embodiments of the present disclosure, each pixel region further includes a third pixel. The third pixel includes at least one display light-emitting sub-pixel, but does not comprise a near-infrared light-emitting sub-pixel or a near-infrared receiving sub-pixel.

According to some exemplary embodiments of the present disclosure, the first pixel, the second pixel and the third pixel are the same in size, and the first pixel, the second pixel and the third pixel each have the same number of display light-emitting sub-pixels, so that the spacing between adjacent sub-pixels in the first pixel and the spacing between adjacent sub-pixels in the second pixel are less than the spacing between adjacent sub-pixels in the third pixel.

According to another aspect of the present disclosure, there is provided a display device, including a display panel as described above, wherein the display device further includes an inductive control identification module, and the inductive control identification module is connected with the inductive control signal line of the near-infrared receiving sub-pixel to receive the measurement signal, and is configured to determine the position of the external object according to the intensity of the measurement signal.

According to some exemplary embodiments of the present disclosure, the display device further includes an amplifier, and the amplifier is connected with the inductive control signal line of the near-infrared receiving sub-pixel and the inductive control identification module respectively, and is configured to amplify the intensity of the measurement signal received from the inductive control signal line.

According to some exemplary embodiments of the present disclosure, the display device further includes a drive chip, and the inductive control identification module is integrated on the drive chip.

According to some exemplary embodiments of the present disclosure, the display device further includes a circuit board, and the inductive control identification module is arranged on the circuit board.

According to some exemplary embodiments of the present disclosure, the display device further includes an inductive control signal voltage supplier, which is connected with the voltage supply signal line of the near-infrared receiving sub-pixel, and is configured to provide a voltage signal to the voltage supply signal line.

According to a further aspect of the present disclosure, there is provided a method for determining the position of an external object by the display device as described above, including the steps of: using the near-infrared light-emitting sub-pixel to transmit near-infrared light; using the near-infrared receiving sub-pixel to receive near-infrared light reflected from the external object and generate a measurement signal accordingly; and using the inductive control identification module to receive the measurement signal of the near-infrared receiving sub-pixel and determine the position of the external object according to the intensity of the measurement signal.

BRIEF DESCRIPTION OF DRAWINGS

The drawings are used to provide a further understanding of the technical solution of the present disclosure, constitute a part of the specification, and are used, together with the exemplary embodiments of the present disclosure, to explain the technical solution of the present disclosure; however, the drawings do not constitute any limitation to the technical solution of the disclosure, wherein.

It shall be noted that the drawings are not necessarily drawn to scale. In addition, throughout all the drawings, like or similar parts, components and/or elements are denoted by the same reference numerals.

DETAILED DESCRIPTION

Figure 1:
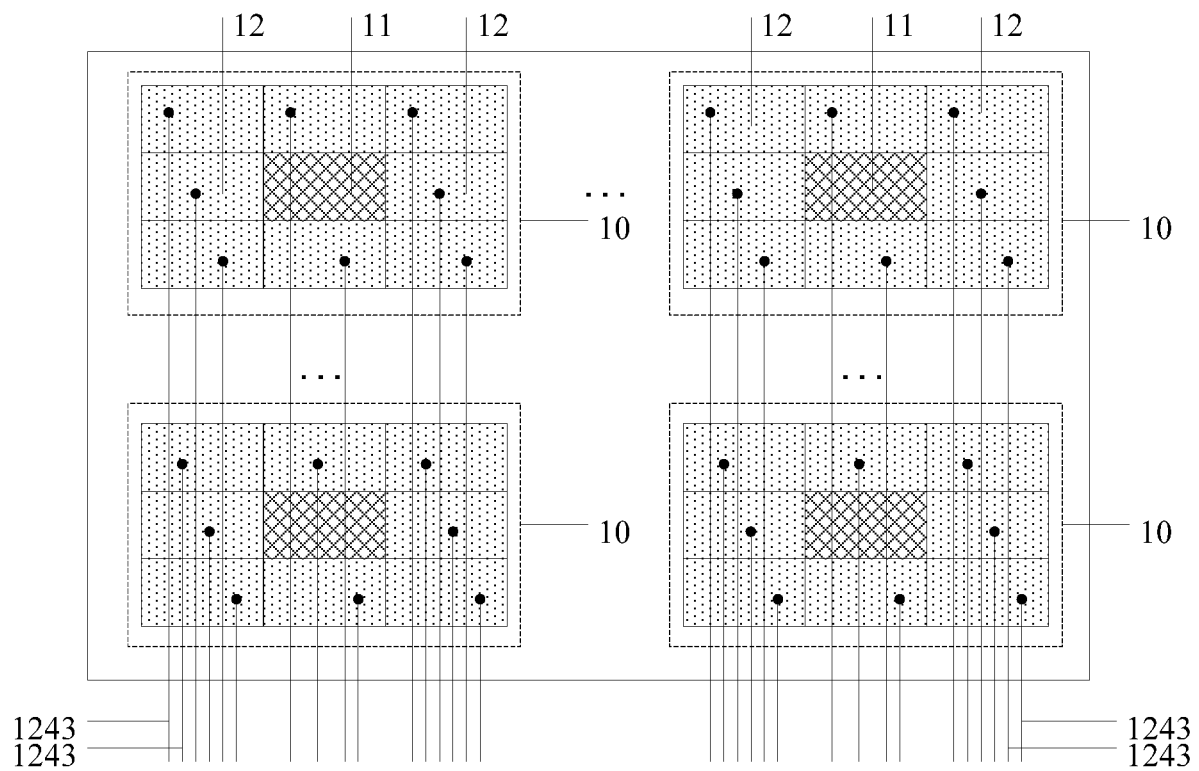
FIG. 1 is a structural schematic view of a display panel according to an exemplary embodiment of the present disclosure.

In order to make the above and further objectives, features and advantages of the present disclosure clearer and more understandable, the exemplary embodiments of the present disclosure will be described in detail with reference to the drawings.

It should also be explained that, in the description of the specification of the present application, expressions such as "an embodiment", "some embodiments", "exemplary embodiments", "specific examples" or "some examples" are intended to mean that specific features, structures, materials or characteristics described in conjunction with the embodiments or examples are contained in at least one embodiment or example of this disclosure. Therefore, schematic descriptions with respect to the above expressions herein do not have to be directed at the same embodiments or examples herein. Instead, specific features, structures, materials or characteristics described thereby can be combined in any one or more embodiments or examples in a suitable manner. Besides, where no contradiction is caused, one skilled in the art can combine and assemble different embodiments or examples described in the specification, and can combine and assemble the features of different embodiments or examples described in the specification.

The steps involved in the method described in the present disclosure are exemplary, and are not necessarily to be implemented in the order as listed. Instead, one or more of these steps may be implemented in a different order or simultaneously according to actual situations. Furthermore, according to actual situations, the described method may also comprise other additional steps. In addition, the steps shown in the flowchart of the drawings can be performed in a computer system in the form of, for example, a set of computer executable instructions.

Unless otherwise defined, all terms (including technical terms and scientific terms) used herein have the same meaning as commonly understood by one having ordinary skills in the art, to which the present disclosure belongs. It should be further understood that terms such as those defined in a common dictionary should be construed as having the same meaning as in the related art and/or in the context of the present specification, and will not be construed in an ideal or overly formal sense, unless defined explicitly as such herein.

The terms used herein are only used for the purpose of describing an exemplary embodiment, rather than limiting the present disclosure. As used herein, the singular forms of "a", "an" and "the" are also intended to comprise the plural forms, unless otherwise specified clearly in the context. It shall also be understood that the terms such as "comprise" and/or "include" used in the specification of the present disclosure indicate the presence of the features, entireties, steps, operations, elements and/or components, but do not exclude the presence of one or more other features, entireties, steps, operations, elements, components and/or groups thereof, or the addition of one or more other features, entireties, steps, operations, elements, components and/or groups thereof. Moreover, the term "and/or" used herein comprises any and all combinations of one or more of the related items as listed. Words like "connect" or "couple" are not limited to physical or mechanical connections, but may comprise electrical connections no matter if they are direct or indirect. It shall be understood that when an element is described as "connected to another element" or "coupled to another element", it may be directly connected to another element or directly coupled to another element, or there may be an intermediate element. To the contrary, when an element is described as "directly connected to another element" or "directly coupled to another element", there is no intermediate element. Terms such as "upper", "lower", "left" and "right" are only used to indicate relative position relationships. When the absolute position of the described object changes, the relative position relationship may also change accordingly.

Some techniques, structures and materials commonly known in the art, to which this disclosure belongs, are not described in detail for the sake of clarity so as to avoid making the present disclosure tediously long.

Figure 2:
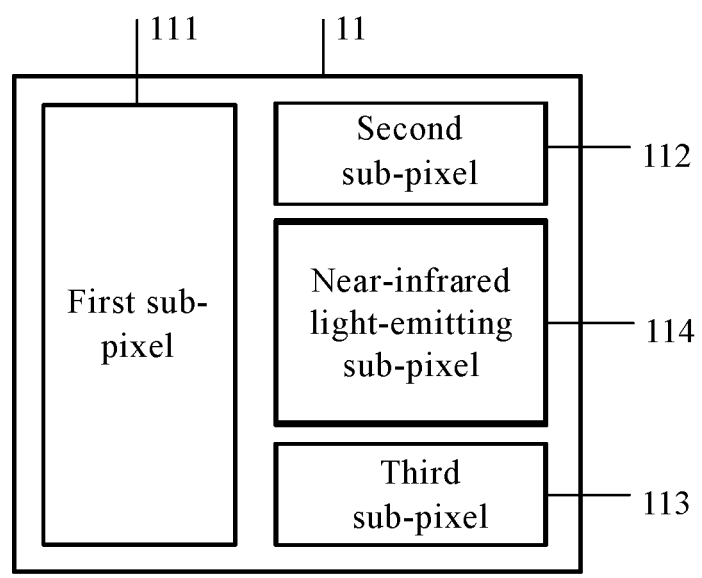
FIG. 2 is a structural schematic view of a first pixel in the display panel as shown in FIG. 1.
Figure 3:
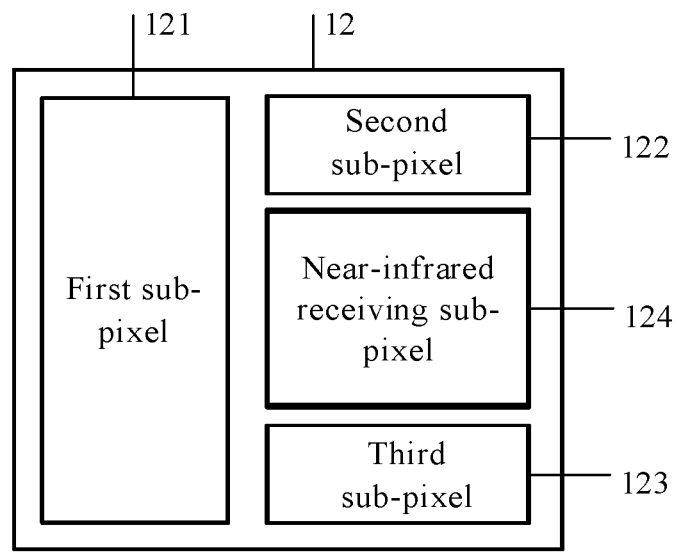
FIG. 3 is a structural schematic view of a second pixel in the display panel as shown in FIG. 1.

With reference to FIGS. 1 to 3, FIG. 1 schematically shows the structure of a display panel according to an exemplary embodiment of the present disclosure, FIG. 2 schematically shows the structure of a first pixel in the display panel as shown in FIG. 1, and FIG. 3 schematically shows the structure of a second pixel in the display panel as shown in FIG. 1.

As shown in FIGS. 1 to 3, the display panel according to the exemplary embodiment of the present disclosure comprises a plurality of pixel regions 10 located in a display area, each pixel region 10 comprises the first pixel 11 and the second pixel 12, the first pixel 11 comprises at least one display light-emitting sub-pixel and at least one near-infrared light-emitting sub-pixel 114, the second pixel 12 comprises at least one display light-emitting sub-pixel and at least one near-infrared receiving sub-pixel 124. The near-infrared light-emitting sub-pixel 114 is configured to emit near-infrared light; and the near-infrared receiving sub-pixel 124 is configured to receive near-infrared light reflected from an external object and generate a measurement signal accordingly.

As shown in FIG. 2, the number of the display light-emitting sub-pixels comprised in the first pixel 11 is three, which are respectively a first sub-pixel 111, a second sub-pixel 112 and a third sub-pixel 113; and as shown in FIG. 3, the number of the display light-emitting sub-pixels comprised in the second pixel 12 is also three, which are respectively a first sub-pixel 121, a second sub-pixel 122 and a third sub-pixel 123. It should be understood that, however, in another exemplary embodiment of the present disclosure, the number of the display light-emitting sub-pixels respectively comprised in the first pixel and the second pixel is not limited to three, but may be any suitable number, as long as it is greater than or equal to one, for example, it may also be four. Similarly, in another exemplary embodiment of the present disclosure, the first pixel may also comprise any suitable number of near-infrared light-emitting sub-pixels, and the second pixel may also comprise any suitable number of near-infrared receiving sub-pixels. The present disclosure does not specifically limit the number of the display light-emitting sub-pixels, near-infrared light-emitting sub-pixels and near-infrared receiving sub-pixels comprised in the first and second pixels.

Further with reference to FIGS. 1 to 3, when the number of the display light-emitting sub-pixels respectively comprised in the first pixel 11 and the second pixel 12 is three, the first sub-pixel 111 in the first pixel 11 may be a red sub-pixel, the second sub-pixel 112 in the first pixel 11 may be a green sub-pixel, and the third sub-pixel 113 in the first pixel 11 may be a blue sub-pixel; and the first sub-pixel 121 in the second pixel 12 may be a red sub-pixel, the second sub-pixel 122 in the second pixel 12 may be a green sub-pixel, and the third sub-pixel 123 in the second pixel 12 may be a blue sub-pixel. When the number of the display light-emitting sub-pixels respectively comprised in the first pixel 11 and the second pixel 12 respectively is four, the first sub-pixel 111 in the first pixel 11 may be a red sub-pixel, the second sub-pixel 112 in the first pixel 11 may be a green sub-pixel, the third sub-pixel 113 in the first pixel 11 may be a blue sub-pixel, and the first sub-pixel 11 may also comprise a fourth sub-pixel, which may be a white sub-pixel; and the first sub-pixel 121 in the second pixel 12 may be a red sub-pixel, the second sub-pixel 122 in the second pixel 12 may be a green sub-pixel, the third sub-pixel 123 in the second pixel 12 may be a blue sub-pixel, and the second pixel 12 may also comprise a fourth sub-pixel, which may be a white sub-pixel.

In the exemplary embodiment of the present disclosure, the near-infrared light-emitting sub-pixel 114 is arranged in the first pixel 11 to emit near-infrared light, and the near-infrared receiving sub-pixel 124 is arranged in the second pixel 12 to receive near-infrared light. When there is an external object approaching the display panel, at least a part of the near-infrared light emitted by the near-infrared light-emitting sub-pixel 114 will be reflected by the external object to the near-infrared receiving sub-pixel 124, so that the near-infrared receiving sub-pixel 124 may receive the near-infrared light reflected by the external object, and generate a measurement signal accordingly. According to the intensities of the received near-infrared light, measurement signals with different intensities may be generated. The measurement signal may be sent to a corresponding inductive control identification module or device to detect the position of the external object. When there is no external object approaching the display panel, the near-infrared light emitted by the near-infrared light-emitting sub-pixel 114 will not be received by the near-infrared receiving sub-pixel 124.

It should be noted that FIG. 1 only shows an exemplary structure of a display panel according to the exemplary embodiment of the present disclosure. Each pixel region comprises one first pixel 11 and eight second pixels 12 surrounding the first pixel 11, that is to say, the first pixel 11 and the second pixels 12 are arranged together in a 3×3 array, and the first pixel 11 is located at the position where the second row and the second column of the 3×3 array intersect. Of course, there may be other ways in terms of the number and arrangement of the first pixel 11 and the second pixel 12, and the number and size of the pixel region 10 in the display panel may be further divided according to the size and resolution of the display panel. The present disclosure does not specifically limit the number of the pixel regions, first pixels, and second pixels.

As a non-limiting example, a plurality of pixel regions 10 may be arranged in an array. In each pixel region 10, the number of the first pixels 11 may be one, the number of the second pixels 12 may be greater than two, and the first pixels 11 and the second pixels 12 may be arranged in an array. Optionally, in each pixel region 10, the number of the first pixels 11 may be one, the number of the second pixels 12 may be three, and the plurality of pixel regions 10 may be arranged in an array, the first pixel 11 may be located in the lower right corner of each pixel region 10, whereas the second pixels 12 may be distributed in the upper left, lower left and upper right corners of each pixel region 10.

By setting the number of the first pixel 11 in each pixel area 10 to be one, the number of the second pixel 12 in each pixel area 10 to be greater than two, and the first pixel 11 and the second pixels 12 to be arranged in an array, the movement trajectory of the external object may be accurately detected by the near-infrared light-emitting sub-pixel 114 and the near-infrared receiving sub-pixel 124.

Figure 4:
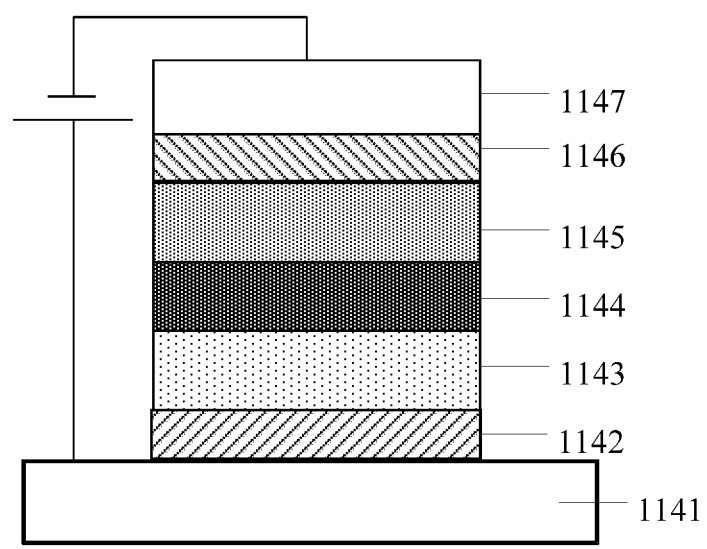
FIG. 4 is a structural schematic view of a near-infrared OLED in a near-infrared light-emitting sub-pixel according to an exemplary embodiment of the present disclosure.

With reference to FIG. 4, it schematically shows the structure of a near-infrared organic light-emitting diode in the near-infrared light-emitting sub-pixel 114 according to an exemplary embodiment of the present disclosure.

In an exemplary embodiment of the present disclosure, the near-infrared light-emitting sub-pixel 114 may comprise the near-infrared organic light-emitting diode, which may comprise an anode 1141, a hole transport layer 1142, an electron blocking layer 1143, a near-infrared light-emitting layer 1144, a hole blocking layer 1145, an electron transport layer 1146 and a cathode 1147 laminated sequentially. The near-infrared light-emitting layer 1144 is formed by adding a near-infrared organic light-emitting material to the light-emitting layer of an organic light-emitting diode. By applying a voltage between the anode 1141 and the cathode 1147, holes are provided by the anode 1141, and enter the near-infrared light-emitting layer 1144 through the hole transport layer 1142 and the electron blocking layer 1143, while electrons are provided by the cathode 1147 and enter the near-infrared light-emitting layer 1144 through the electron transport layer 1146 and the hole blocking layer 1145. In the near-infrared light-emitting layer 1144, the electron and the hole form an exciton that radiate to emit near-infrared light with certain wavelength when being de-excited.

In addition, it is easy to understand that the display light-emitting sub-pixel in the first and second pixels according to the exemplary embodiments of the present disclosure may comprise an organic light-emitting diode having a similar structure, except that the light-emitting layer does not comprise a near-infrared organic light-emitting material, and therefore no near-infrared light-emitting layer is formed. Moreover, the light-emitting principle of the organic light-emitting diode comprised in the display light-emitting sub-pixel is similar to that described with reference to the near-infrared organic light-emitting diode.

In order to drive the near-infrared organic light-emitting diode in the near-infrared light-emitting sub-pixel 114 to emit near-infrared light and drive the organic light-emitting diode comprised in the display light-emitting sub-pixel, it is also required to dispose a sub-pixel drive circuit in the near-infrared light-emitting sub-pixel 114 and the display light-emitting sub-pixel.

Figure 5:
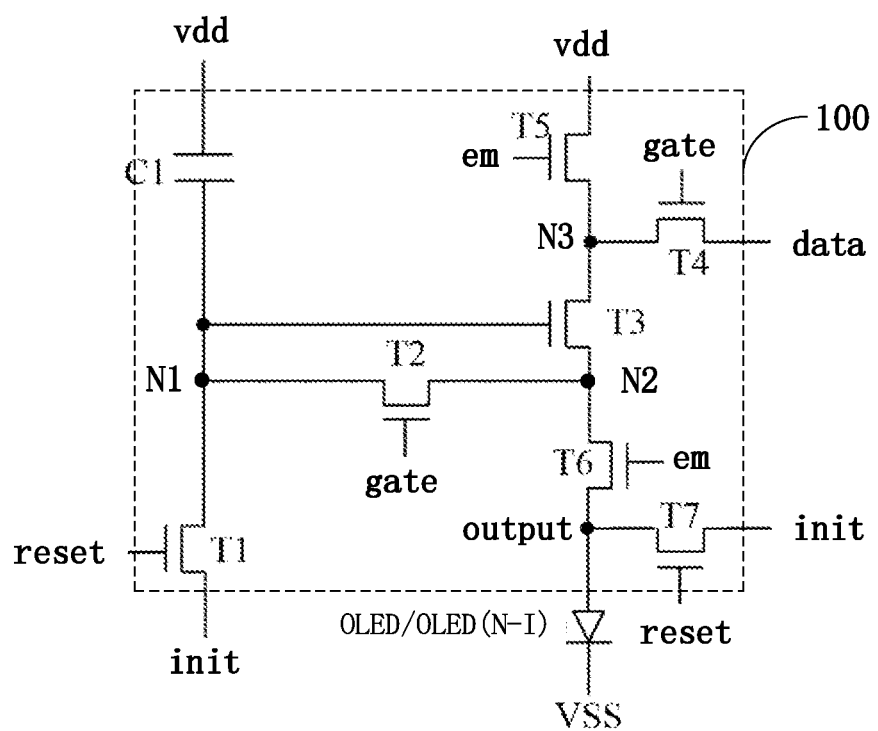
FIG. 5 is a schematic circuit diagram of a sub-pixel drive circuit according to an exemplary embodiment of the present disclosure.

With reference to FIG. 5, it shows an exemplary circuit of the sub-pixel drive circuit 100 according to an exemplary embodiment of the present disclosure, and the sub-pixel drive circuit 100 may be used to drive an organic light-emitting diode in a display light-emitting sub-pixel and a near-infrared organic light-emitting diode in a near-infrared light-emitting sub-pixel.

As shown in FIG. 5, the sub-pixel drive circuit 100 comprises a voltage signal terminal vdd, a gate line signal terminal gate, a light-emitting control signal terminal em, a data signal terminal data, a reset signal terminal reset, an initialization signal terminal init and an output terminal output, as well as a first transistor T1, a second transistor T2, a third transistor T3, a fourth transistor T4, a fifth transistor T5, a sixth transistor T6, a seventh transistor T7 and a capacitor C1. The voltage signal terminal vdd is configured to receive a voltage signal, the gate line signal terminal gate is configured to receive a gate line control signal, the light-emitting control signal terminal em is configured to receive a light-emitting control signal, the data signal terminal data is configured to receive a data signal (the data signal may be a display data signal or a near-infrared data signal according to actual needs), the reset signal terminal reset is configured to receive a reset signal, the initialization signal terminal init is configured to receive an initialization signal, and the output terminal output is configured to output an output signal.

It should be noted that the transistor used in each exemplary embodiment of the present disclosure may be a thin-film transistor, a field effect transistor or other elements having the same characteristics. In various exemplary embodiments of the present disclosure, the transistors are typically made in a way that their sources and drains can be used interchangeably, so that there are no substantial differences between their sources and drains in terms of the description of the connection relationship. In various exemplary embodiments of the present disclosure, in order to distinguish the source and the drain of a transistor, one of the electrodes is called a first electrode, the other is called a second electrode, and the gate is called a control electrode. In the case of an N-type transistor, the active voltage for turning it on by the gate has a high potential, and the inactive voltage for turning it off by the gate has a low potential; and in the case of a P-type transistor, the active voltage for turning it on by the gate has a low potential, and the inactive voltage for turning it off by the gate has a high potential. It should be understood that, the active potential or the inactive potential is not intended to refer to a specific potential, but may comprise a potential range. In addition, the terms "level" and "voltage level" herein may be used interchangeably with "potential".

The following exemplary embodiment of the present disclosure is described based on an N-type transistor, as a non-limiting example. That is to say, the first transistor T1, the second transistor T2, the third transistor T3, the fourth transistor T4, the fifth transistor T5, the sixth transistor T6 and the seventh transistor T7 are all N-type transistors, the first electrode is a drain, the second electrode is a source, and the voltage signal terminal vdd is at a high potential. However, it is easy to understand that under the teaching of the present disclosure, those skilled in the art can use a P-type transistor to replace one or more or all N-type transistors in various exemplary embodiments of the present disclosure, or can add one or more components to or remove one or more components from various exemplary embodiments of the present disclosure, without departing from the spirit and scope of the present disclosure. In addition, other embodiments may be envisaged without contradicting the teachings of the present disclosure.

With further reference to FIG. 5, the control electrode of the first transistor T1 is connected with the reset signal terminal reset, the first electrode thereof is connected with the initialization signal terminal init, and the second electrode thereof is connected with a first node N1. The control electrode of the second transistor T2 is connected with the gate line signal terminal gate, the first electrode thereof is connected with the first node N1, and the second electrode thereof is connected with a second node N2. The control electrode of the third transistor T3 is connected with the first node N1, the first electrode thereof is connected with a third node N3, and the second electrode thereof is connected with the second node N2. The control electrode of the fourth transistor T4 is connected with the gate line signal terminal gate, the first electrode thereof is connected with the data signal terminal data, and the second electrode thereof is connected with the third node N3. The control electrode of the fifth transistor T5 is connected with the light-emitting control signal terminal em, the first electrode thereof is connected with the voltage signal terminal vdd, and the second electrode thereof is connected with the third node N3. The control electrode of the sixth transistor T6 is connected with the light-emitting control signal terminal em, the first electrode thereof is connected with the second node N2, and the second electrode thereof is connected with the output terminal output. The control electrode of the seventh transistor T7 is connected with the reset signal terminal reset, the first electrode thereof is connected with the initialization signal terminal init, and the second electrode thereof is connected with the output terminal output. The first electrode of the capacitor C1 is connected with the voltage signal terminal vdd, and the second electrode thereof is connected with the first node N1.

In FIG. 5, N-I (Near Infrared) represents near-infrared light, and OLED (Organic Light-Emitting Diode) represents an organic light-emitting diode. Therefore, the reference sign OLED/OLED (N-I) in FIG. 5 indicates that according to actual needs, the element may be an organic light-emitting diode in a display light-emitting sub-pixel or a near-infrared organic light-emitting diode in a near-infrared light-emitting sub-pixel 114 (see FIG. 4 for its specific structure). When the sub-pixel drive circuit 100 is used to drive the organic light-emitting diode in the display light-emitting sub-pixel, the output terminal output thereof may be connected with the anode of the organic light-emitting diode; and when the sub-pixel drive circuit 100 is used to drive the near-infrared organic light-emitting diode in the near-infrared light-emitting sub-pixel, the output terminal output thereof may be connected with the anode of the near-infrared organic light-emitting diode.

Figure 6:
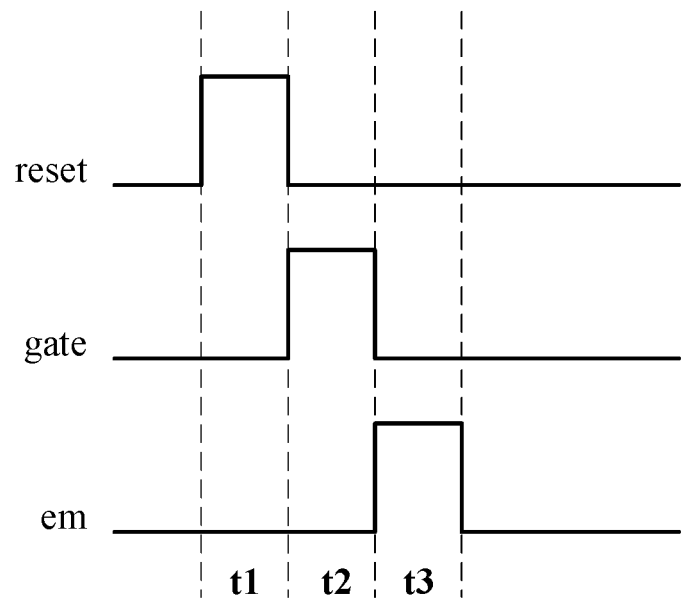
FIG. 6 is an operating timing sequence diagram of the sub-pixel drive circuit as shown in FIG. 5.

With reference to FIG. 6, it schematically shows the operating timing sequence for the sub-pixel drive circuit 100 as shown in FIG. 5.

In an initialization stage t1, the reset signal inputted by the reset signal terminal reset is at a high level, the control signal inputted by the gate signal terminal gate is at a low level, and the light-emitting control signal inputted by the light-emitting control signal terminal em is also at a low level, so that the second transistor T2, the fourth transistor T4, the fifth transistor T5 and the sixth transistor T6 are turned off, and that the first transistor T1 and the seventh transistor T7 are turned on and the turn-on of the first transistor T1 brings the initialization signal terminal init into conduction with the first node N1, thereby initializing the potential at the second electrode (i.e. at the first node N1) of the capacitor C1 according to the initialization signal inputted by the initialization signal terminal init, and meanwhile, the third transistor T3 is turned on to prepare for the subsequent data writing, and the turn-on of the seventh transistor T7 brings the initialization signal terminal init into conduction with the output terminal output, thereby initializing the anode of the organic light-emitting diode OLED or near-infrared organic light-emitting diode OLED (N-I) according to the initialization signal inputted by the initialization signal terminal init, and neutralizing a carrier stored on the anode to improve the contrast of the organic light-emitting diode OLED or near-infrared organic light-emitting diode OLED (N-I).

In a data writing stage t2, the reset signal inputted by the reset signal terminal reset is at a low level, the control signal inputted by the gate line signal terminal gate is at a high level, and the light-emitting control signal inputted by the light-emitting control signal terminal em is at a low level, so that the first transistor T1, the seventh transistor T7, the fifth transistor T5, and the sixth transistor T6 are turned off, and the second transistor T2 and the fourth transistor T4 are turned on. Since the third transistor T3 is in an ON state, the data signal inputted by the data signal terminal data may be written into the second electrode of the capacitor C1 (i.e., at the first node N1).

In the light-emitting control stage t3, the reset signal inputted by the reset signal terminal reset is at a low level, the control signal inputted by the gate line signal terminal gate is at a low level, and the light-emitting control signal inputted by the light-emitting control signal terminal em is at a high level, so that the first transistor T1, the seventh transistor T7, the second transistor T2, and the fourth transistor T4 are turned off, and the fifth transistor T5 and the sixth transistor T6 are turned on, and the third transistor T3 is in an ON state to thereby provide the voltage signal of the voltage signal terminal vdd to the anode of the organic light-emitting diode or near-infrared organic light-emitting diode, so that the organic light-emitting diode emits light or the near-infrared organic light-emitting diode emits near-infrared light.

Figure 7:
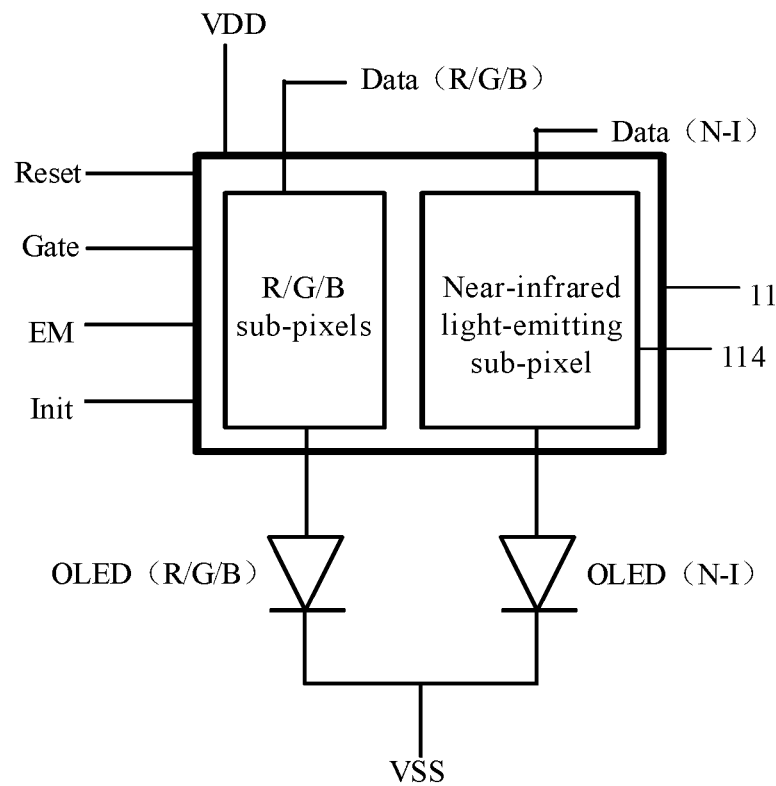
FIG. 7 is a schematic line connection view of a first pixel according to an exemplary embodiment of the present disclosure.

With reference to FIG. 7, it schematically shows the line connection of the first pixel according to an embodiment of the present disclosure.

As shown in FIG. 7 and with reference to FIG. 2, the number of the display light-emitting sub-pixels comprised in the first pixel 11 may be three, which are the first sub-pixel 111, the second sub-pixel 112, and the third sub-pixel 113 respectively, and the first sub-pixel 111 is an R (red) sub-pixel, the second sub-pixel 112 is a G (green) sub-pixel, and the third sub-pixel 113 is a B (blue) sub-pixel. The first pixel 11 further comprises: a reset signal line Reset configured to transmit a reset signal; a gate line Gate configured to transmit a gate line control signal; an initialization signal line Init configured to transmit an initialization signal; a light-emitting control line EM configured to transmit a light-emitting signal; a first voltage signal line VDD configured to transmit a first voltage signal; a second voltage signal line VSS configured to transmit a second voltage signal; a display data signal line Data (R/G/B) configured to transmit a display data signal for a display light-emitting sub-pixel; and a near-infrared data signal line Data (N-I), which is configured to transmit a near-infrared data signal for a near-infrared light-emitting sub-pixel.

For the sub-pixel drive circuit 100 used for each display light-emitting sub-pixel and near-infrared light-emitting sub-pixel in the first pixel 11, the reset signal terminal reset is connected to the reset signal line Reset, and the gate line signal terminal gate is connected to the gate line Gate, the light-emitting control signal terminal em is connected to the light-emitting control line EM, the initialization signal terminal init is connected to the initialization signal line Init, and the voltage signal terminal vdd is connected to the first voltage signal line VDD. The data signal terminal data of the sub-pixel drive circuit 100 of the near-infrared light-emitting sub-pixel is connected to the near-infrared data signal line Data (N-I), and the output terminal output thereof is connected to the anode of the near-infrared organic light-emitting diode OLED (N-I). The data signal terminal data of the sub-pixel drive circuit 100 of the display light-emitting sub-pixel is connected to the display data signal line Data (R/G/B), and the output terminal output thereof is connected to the anode of the organic light-emitting diode OLED. The cathodes of the organic light-emitting diode OLED and the near-infrared organic light-emitting diode OLED (N-I) are both connected to the second voltage signal line VSS.

In order to reduce the space occupied by the near-infrared light-emitting sub-pixel 114 as much as possible, the reset signal terminal reset, the gate line signal terminal gate, the initialization signal terminal init, the voltage signal terminal vdd, and the light-emitting control signal terminal em in the sub-pixel drive circuit of the near-infrared light-emitting sub-pixel 114, as well as the cathode of the near-infrared organic light-emitting diode in the near-infrared light-emitting sub-pixel 114, may be respectively shared with the reset signal terminal reset, the gate line signal terminal gate, the initialization signal terminal init, the voltage signal terminal vdd, the light-emitting control signal terminal em in the sub-pixel drive circuit of any one of the R, G, and B sub-pixels in the first pixel 11, as well as the cathode of the organic light-emitting diode of any one of the sub-pixels. That is, the reset signal terminal reset, the gate line signal terminal gate, the initialization signal terminal init, the voltage signal terminal vdd, the light-emitting control signal terminal em in the sub-pixel drive circuit of any one of the R, G, and B sub-pixels in the first pixel 11, as well as the cathode of the organic light-emitting diode of any one of the sub-pixels, may be respectively connected with the reset signal terminal reset, the gate line signal terminal gate, the initialization signal terminal init, the voltage signal terminal vdd, and the light-emitting control signal terminal em in the sub-pixel drive circuit of the near-infrared light-emitting sub-pixel 114, as well as the cathode of the near-infrared organic light-emitting diode in the near-infrared light-emitting sub-pixel 114.

For example, if any one of the R, G, and B sub-pixels in the first pixel 11 is the B sub-pixel, the reset signal terminal reset in the sub-pixel drive circuit of the B sub-pixel may be connected with the reset signal terminal reset in the sub-pixel drive circuit of the near-infrared light-emitting sub-pixel 114, the gate line signal terminal gate in the sub-pixel drive circuit of the B sub-pixel may be connected with the gate line signal terminal gate in the sub-pixel drive circuit of the near-infrared light-emitting sub-pixel 114, the initialization signal terminal init in the sub-pixel drive circuit of the B sub-pixel may be connected with the initial signal terminal init in the sub-pixel drive circuit of the near-infrared light-emitting sub-pixel 114, the voltage signal terminal vdd in the sub-pixel drive circuit of the B sub-pixel may be connected with the voltage signal terminal vdd in the sub-pixel drive circuit of the near-infrared light-emitting sub-pixel 114, the light-emitting control signal terminal em in the sub-pixel drive circuit of the B sub-pixel may be connected with the light-emitting control signal terminal em in the sub-pixel drive circuit of the near-infrared light-emitting sub-pixel 114, and the cathode of the organic light-emitting diode of the B sub-pixel may be connected with the cathode of the near-infrared organic light-emitting diode of the near-infrared light-emitting sub-pixel 114.

Since it is required to consider that, when the R, G, and B sub-pixels in the first pixel 11 are operating, the data signals inputted by the corresponding display data signal line Data (R/G/B) are variable, the near-infrared data signal line Data (N-I) of the near-infrared light-emitting sub-pixel 114 cannot be shared with the R, G, and B sub-pixels in the first pixel 11. Instead, it is required to dispose a separate near-infrared data signal line Data (N-I) to provide a stable data signal for the near-infrared light-emitting sub-pixel 114.

At the same time, in order to reduce the complexity of the manufacturing process, the near-infrared data signal line Data (N-I) connected with the near-infrared light-emitting sub-pixel 114, and the display data signal lines Data (R/G/B) respectively connected with the R sub-pixel, G sub-pixel, and B sub-pixel in the first pixel 11 may be arranged in the same layer, so that the data signal lines of the near-infrared light-emitting sub-pixel 114, R sub-pixel, G sub-pixel, and B sub-pixel may be manufactured in one manufacturing process.

Figure 8:
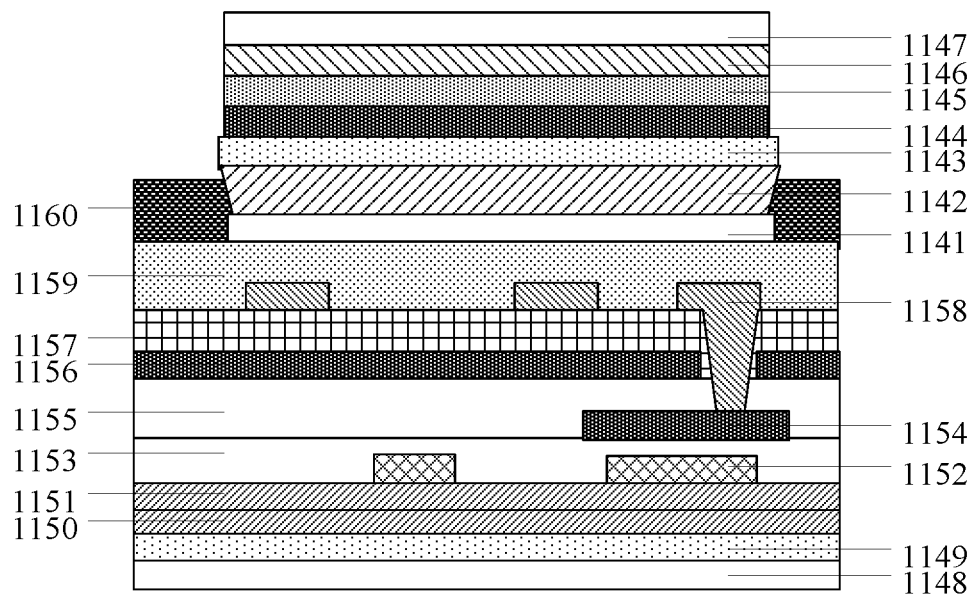
FIG. 8 is a cross-sectional structural schematic view of a near-infrared light-emitting sub-pixel according to an exemplary embodiment of the present disclosure.

With reference to FIG. 8, it is a schematic cross-sectional view of the near-infrared light-emitting sub-pixel 114 according to an exemplary embodiment of the present disclosure.

First, a flexible layer 1149 may be formed on a substrate 1148, and a buffer layer may be formed on the flexible layer 1149. This is mainly for a flexible substrate. For a common rigid substrate, a buffer layer may be directly formed on the substrate 1148. The buffer layer may comprise a first buffer layer 1150 and a second buffer layer 1151. The material of the first buffer layer 1150 may be silicon nitride SiNx, and the material of the second buffer layer 1151 may be silicon oxide SiOx. Next, polysilicon 1152 may be formed on the buffer layer by a patterning process. Then, a first gate insulating layer 1153 may be deposited, a first gate 1154 may be formed on the first gate insulating layer 1153 by a patterning process, and then a second gate insulating layer 1155, a second gate 1156, and an interlayer dielectric layer 1157 may be sequentially deposited, wherein the material of the first gate insulating layer 1153 may be silicon oxide, the material of the second gate insulating layer 1155 may be silicon nitride, and the material of the interlayer dielectric layer 1157 may be silicon nitride or silicon oxide. Then, a via hole passing through the interlayer dielectric layer 1157, the second gate 1156, and the second gate insulating layer 1155 may be formed at the position corresponding to the first gate electrode 1154. A source-drain electrode 1158 may be formed on the interlayer dielectric layer 1157 by a patterning process. Correspondingly, at the position corresponding to the first gate electrode 1154, the source-drain electrode 1158 is connected with the first gate 1154 via the via hole. Then, a planarization layer 1159 may be deposited, and a pixel defining layer 1160 may be formed by a patterning process. Finally, in the opening area of the pixel defining layer 1160 there may be formed the near-infrared organic light-emitting diode of the near-infrared light-emitting sub-pixel 114, which may specifically comprise the anode 1141, the hole transport layer 1142, the electron blocking layer 1143, the near-infrared light-emitting layer 1144, the hole blocking layer 1145, the electron transport layer 1146, and the cathode 1147 laminated sequentially.

The material of the source-drain electrode 1158 may be Ti/Al/Ti, and a specific patterning process may comprise sputtering, PR (Photo Resist) coating, exposure, development, etching, and striping etc. The material of the near-infrared light-emitting layer 1144 is a near-infrared organic light-emitting material. During the manufacturing process, the near-infrared light-emitting layer 1144 needs to be manufactured separately, so a mask process is added. The specific process is similar to that of the light-emitting layer of the R/G/B sub-pixel.

It should be noted that other structures in FIG. 8 except for the organic light-emitting diode are designed to form the drive circuit in FIG. 5. For example, the first gate 1154 and the second gate 1156 constitute the capacitor C1 in FIG. 5, and meanwhile, since the second terminal of the capacitor C1 is also connected with the control electrode of the third transistor T3, the first gate 1154 also acts as the control electrode of the third transistor T3, the source-drain electrode 1158 connected with the first gate 1154 also acts as the source of the third transistor T3 and the drain of the second transistor T2, and the source-drain electrode 1158 formed at other positions of the interlayer dielectric layer 1157 may act as the wiring of the data signal terminal data, the voltage signal terminal vdd, etc. It should be noted that the first transistor T1, the fourth transistor T4, the fifth transistor T5, the sixth transistor T6 and the seventh transistor T7 in FIG. 5 are not shown in FIG. 8.

Figure 9:
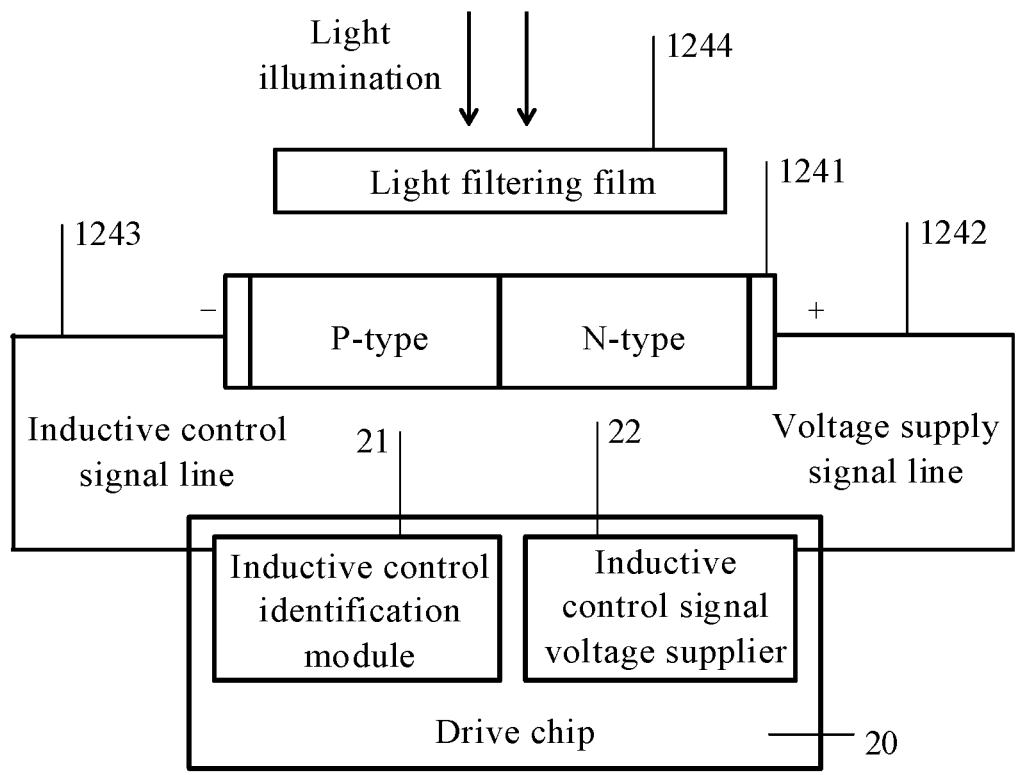
FIG. 9 is a structural schematic view of a near-infrared receiving sub-pixel according to an exemplary embodiment of the present disclosure.

With reference to FIG. 9, it schematically shows the structure of the near-infrared receiving sub-pixel according to an exemplary embodiment of the present disclosure.

The near-infrared receiving sub-pixel 124 comprises a PN junction semiconductor 1241, a voltage supply signal line 1242, an inductive control signal line 1243 and a light filtering film 1244. The N-type semiconductor in the PN junction semiconductor 1241 is connected with the voltage supply signal line 1242, the P-type semiconductor in the PN junction semiconductor 1241 is connected with the inductive control signal line 1243, and the light filtering film 1244 is arranged on one side of the light receiving surface of the PN junction semiconductor 1241.

When the voltage supply signal line 1242 provides a stable voltage, it may apply a certain a reverse voltage to the PN junction semiconductor 1241, so the PN junction semiconductor 1241 will have a very small reverse current, which may be called a dark current. When the near-infrared light emitted by the near-infrared light-emitting sub-pixel 114 is reflected by an external object, and then radiated to the PN junction semiconductor 1241 through the filter film 1244, the reverse current will increase dramatically under the action of a photo-generated carrier, and the reverse current will be sent to an inductive control identification module 21 through the inductive control signal line 1243. The position of the external object may be analyzed through the inductive control identification module 21 according to or based on the intensity of the received reverse current.

The light filtering film 1244 may only allow the near-infrared light to pass, and filter other light except the near-infrared light, so as to avoid other light from irradiating onto the PN junction semiconductor 1241, thereby affecting the identification accuracy of external objects.

Figure 10:
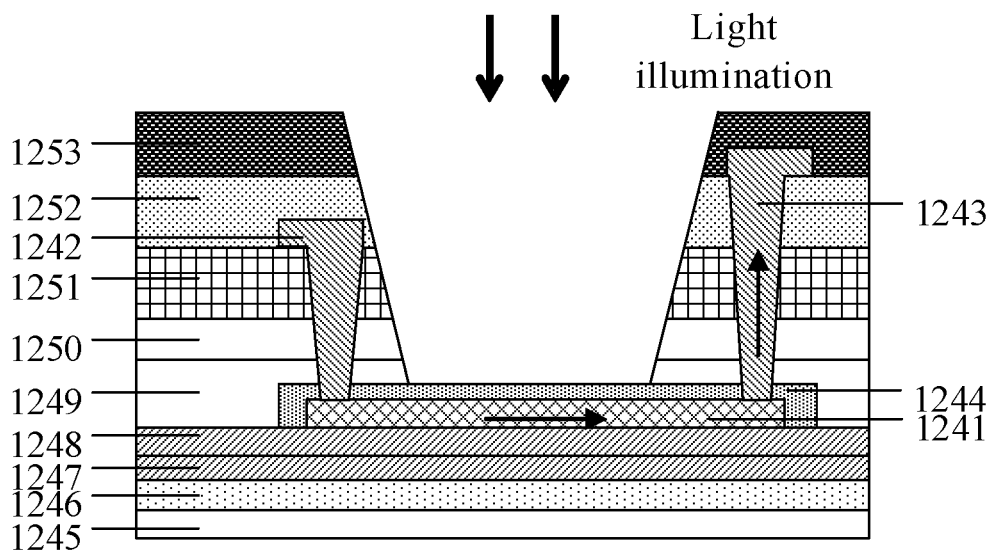
FIG. 10 is a cross-sectional structural schematic view of a first type of near-infrared receiving sub-pixel according to an exemplary embodiment of the present disclosure.
Figure 11:
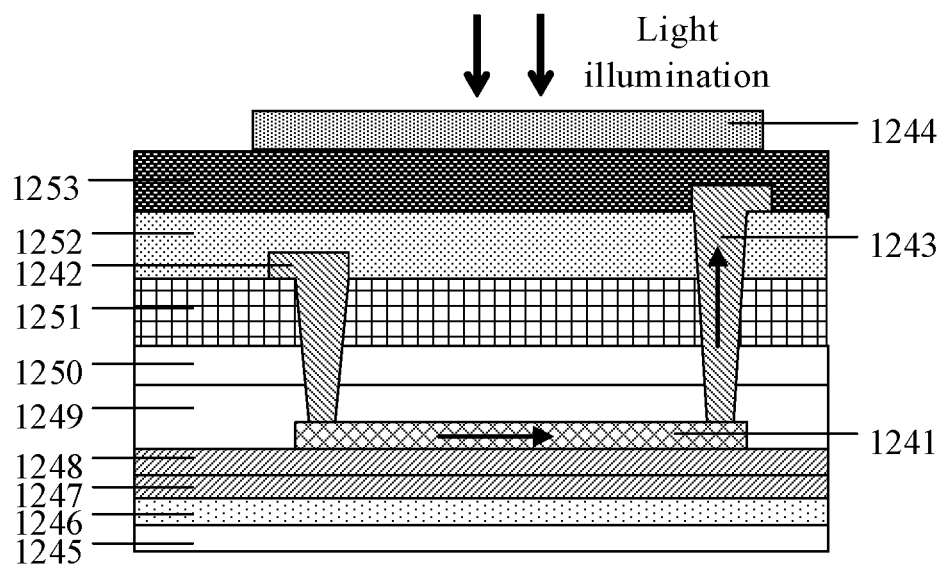
FIG. 11 is a cross-sectional structural schematic view of a second type of near-infrared receiving sub-pixel according to an exemplary embodiment of the present disclosure.

With reference to FIGS. 10 and 11, FIG. 10 is a schematic structural cross-sectional view of the first type of near-infrared receiving sub-pixel according to the exemplary embodiment of the present disclosure, and FIG. 11 is a schematic structural cross-sectional view of the second type of near-infrared receiving sub-pixel according to the exemplary embodiment of the present disclosure.

As shown in FIGS. 10 and 11, the near-infrared receiving sub-pixel 124 further comprises a buffer layer, a gate insulating layer, an interlayer dielectric layer 1251, a planarization layer 1252 and a pixel defining layer 1253 successively formed on a substrate 1245; the PN junction semiconductor 1241 may be formed on the buffer layer, the voltage supply signal line 1242 may be formed on the interlayer dielectric layer 1251, and the inductive control signal line 1243 may be formed on the planarization layer 1252.

In the near-infrared receiving sub-pixel 124, the reference numeral 1246 indicates a flexible layer, that is, a flexible layer 1246 may be arranged on the flexible substrate, but the layer may be removed for a rigid substrate. The buffer layer in the near-infrared receiving sub-pixel 124 may comprise a first buffer layer 1247 and a second buffer layer 1248, and a PN junction semiconductor 1241 may be formed on the second buffer layer 1248. The material of the first buffer layer 1247 may be silicon nitride, and the material of the second buffer layer 1248 may be silicon oxide. The gate insulating layer in the near-infrared receiving sub-pixel 124 may comprise a first gate insulating layer 1249 and a second gate insulating layer 1250, the material of the first gate insulating layer 1249 may be silicon oxide, the material of the second gate insulating layer 1250 may be silicon nitride, and the material of the interlayer dielectric layer 1251 may be silicon nitride or silicon oxide.

The voltage supply signal line 1242 may be formed on the interlayer dielectric layer 1251, and the inductive control signal line 1243 may be formed on the planarization layer 1252; wherein the voltage supply signal line 1242 may be arranged in the same layer as the data line, and the material of the inductive control signal line 1243 may be Ti/Al/Ti. In order to save the wiring space, the inductive control signal line 1243 may be arranged on the planarization layer 1252, so that it is not arranged in the same layer as the data line.

In the structure of the near-infrared receiving sub-pixel 124 shown in FIG. 10, the light filtering film 1244 may be arranged on the light receiving surface of the PN junction semiconductor 1241, and a via hole passing through the pixel defining layer 1253, the planarization layer 1252, the interlayer dielectric layer 1251 and the gate insulating layer is formed at the position corresponding to the light filtering film 1244.

The specific process for manufacturing the structure of the near-infrared receiving sub-pixel 124 as shown in FIG. 10 may be that: the flexible layer 1246 may be formed on the substrate 1245, the first buffer layer 1247 and the second buffer layer 1248 may be sequentially deposited on the flexible layer 1246, the PN junction semiconductor 1241 may be formed on the second buffer layer 1248, the light filtering film 1244 may be formed on the light receiving surface of the PN junction semiconductor 1241, and then the first gate insulating layer 1249, the second gate insulating layer 1250 and the interlayer dielectric layer 1251 may be sequentially deposited, a first via hole passing through the interlayer dielectric layer 1251, the second gate insulating layer 1250, the first gate insulating layer 1249 and the light filtering film 1244 may be formed at the position corresponding to the N-type semiconductor of the PN injunction semiconductor 1241, and then, the voltage supply signal line 1242 may be formed on the interlayer dielectric layer 1251 and may be connected with the N-type semiconductor in the PN junction semiconductor 1241 through the first via hole; next, the planarization layer 1252 may be formed, a second via hole passing through the planarization layer 1252, the interlayer dielectric layer 1251, the second gate insulating layer 1250, the first gate insulating layer 1249 and the light filtering film 1244 may be formed at the position corresponding to the P-type semiconductor in the PN junction semiconductor 1241, and then, the inductive control signal line 1243 may be formed on the planarization layer 1252, and may be connected with the P-type semiconductor in the PN junction semiconductor 1241 through the second via hole; finally, the pixel defining layer 1253 may be formed on the planarization layer 1252, and all other film layers on the PN junction semiconductor 1241 and the light filtering film 1244 may be hollowed out, and a via hole passing through the pixel defining layer 1253, the planarization layer 1252, the interlayer dielectric layer 1251, the second gate insulating layer 1250 and first gate insulating layer 1249 may be formed at the position corresponding to the light filtering film 1244.

In the structure of the near-infrared receiving sub-pixel 124 as shown in FIG. 10, since the light directly irradiates on the light filtering film 1244, the attenuation of the light between the film layers is reduced, and the sensitivity of the near-infrared receiving sub-pixel 124 is improved.

In the structure of the near-infrared receiving sub-pixel 124 as shown in FIG. 11, the light filtering film 1244 is arranged on the pixel defining layer 1253, and the orthographic projection of the light filtering film 1244 on the PN junction semiconductor 1241 covers the PN junction semiconductor 1241.

The specific process for manufacturing the structure of the near-infrared receiving sub-pixel 124 as shown in FIG. 11 may be that: the flexible layer 1246 may be formed on the substrate 1245, the first buffer layer 1247 and the second buffer layer 1248 may be sequentially deposited on the flexible layer 1246, the PN junction semiconductor 1241 may be formed on the second buffer layer 1248, and then the first gate insulating layer 1249, the second gate insulating layer 1250 and the interlayer dielectric layer 1251 may be sequentially deposited, a first via hole passing through the interlayer dielectric layer 1251, the second gate insulating layer 1250 and the first gate insulating layer 1249 may be formed at the position corresponding to the N-type semiconductor of the PN injunction semiconductor 1241, and then, the voltage supply signal line 1242 may be formed on the interlayer dielectric layer 1251 and may be connected with the N-type semiconductor in the PN junction semiconductor 1241 through the first via hole; next, the planarization layer 1252 may be formed, a second via hole passing through the planarization layer 1252, the interlayer dielectric layer 1251, the second gate insulating layer 1250 and the first gate insulating layer 1249 may be formed at the position corresponding to the P-type semiconductor in the PN junction semiconductor 1241, and then, the inductive control signal line 1243 may be formed on the planarization layer 1252, and may be connected with the P-type semiconductor in the PN junction semiconductor 1241 through the second via hole; finally, the pixel defining layer 1253 may be formed on the planarization layer 1252, and the light filtering film 1244 may be formed on the pixel defining layer 1253.

In the structure of the near-infrared receiving sub-pixel 124 as shown in FIG. 11, since the light filtering film 1244 is directly formed on the pixel defining layer 1253, the process complexity is low, the cost is low, and the production efficiency is high.

It should be explained that the arrows in the PN junction semiconductor 1241 in FIGS. 10 and 11 indicate the transmission direction of the reverse current. When the near-infrared light irradiates onto the PN junction semiconductor 1241, the reverse current increases sharply and flows from the PN junction semiconductor 1241 to the inductive control signal line 1243.

The main formation process of the PN junction semiconductor 1241 will be introduced as follows:

With reference to FIGS. 12 to 16, they show a process for forming an N-type semiconductor in a PN junction semiconductor according to an exemplary embodiment of the present disclosure, and with reference to FIGS. 17 to 21, they show a process for forming a P-type semiconductor in a PN junction semiconductor according to an exemplary embodiment of the present disclosure.

First, a buffer layer 1260 may be formed on the substrate 1245, the buffer layer 1260 may comprise a first buffer layer 1247 and a second buffer layer 1248, polysilicon 1261 may be formed on the buffer layer 1260, and then a gate insulating layer 1262 may be deposited, the gate insulating layer 1262 may comprise a first gate insulating layer 1249 and a second gate insulating layer 1250, and a gate 1263 may be formed on the gate insulating layer 1262.

To simplify the formation process of the PN junction semiconductor 1241, the buffer layer 1260 and the gate insulating layer 1262 may be simplified into one layer. It can be understood that the buffer layer 1260 may comprise the first buffer layer 1247 and the second buffer layer 1248 in FIG. 10 or 11, and the gate insulating layer 1262 may comprise the first gate insulating layer 1249 and the second gate insulating layer 1250 in FIG. 10 or 11.

Figure 12:
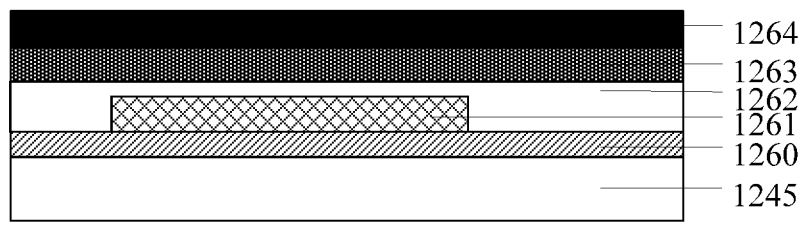
FIG. 12 is a schematic view of a photoresist coated structure when forming an N-type semiconductor in a PN junction semiconductor, according to an exemplary embodiment of the present disclosure.
Figure 13:
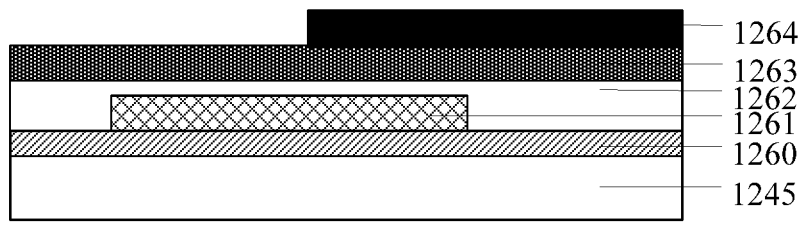
FIG. 13 is a schematic view of an exposed and developed structure when forming an N-type semiconductor in a PN junction semiconductor, according to an exemplary embodiment of the present disclosure.
Figure 14:
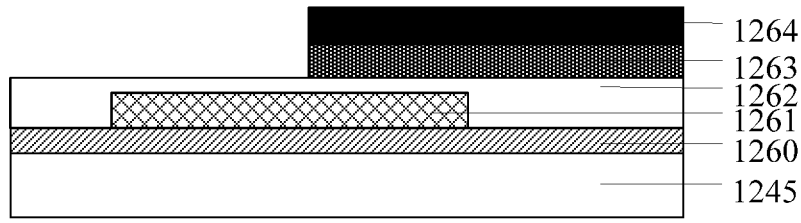
FIG. 14 is a schematic view of an etched structure when forming an N-type semiconductor in a PN junction semiconductor, according to an exemplary embodiment of the present disclosure.
Figure 15:
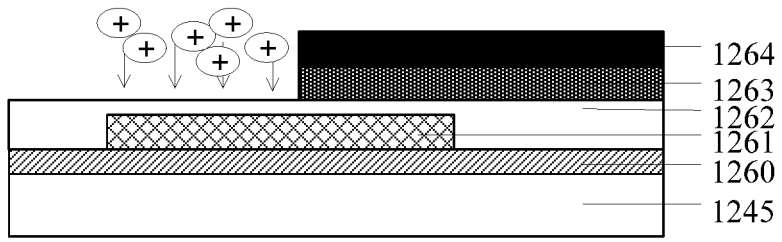
FIG. 15 is a schematic view of a hole-doped structure when forming an N-type semiconductor in a PN junction semiconductor, according to an exemplary embodiment of the present disclosure.
Figure 16:
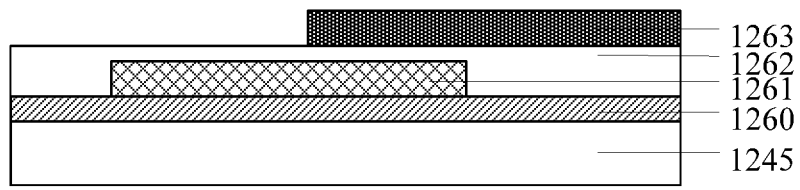
FIG. 16 is a schematic view of a photoresist removed structure when forming an N-type semiconductor in a PN junction semiconductor according to an exemplary embodiment of the present disclosure.

As shown in FIG. 12, a photoresist 1264 may be coated on the gate 1263; as shown in FIG. 13, a part of the photoresist 1264 may be removed from the gate 1263 by processes like exposure and development so as to form a hole doping region; as shown in FIG. 14, the gate 1263 in the hole doping area may be etched; as shown in FIG. 15, holes may be injected into the hole doping region by, e.g., phosphorus doping; and as shown in FIG. 16, the rest photoresist 1264 may be removed from the gate 1263 to thereby form the N-type semiconductor.

Figure 17:
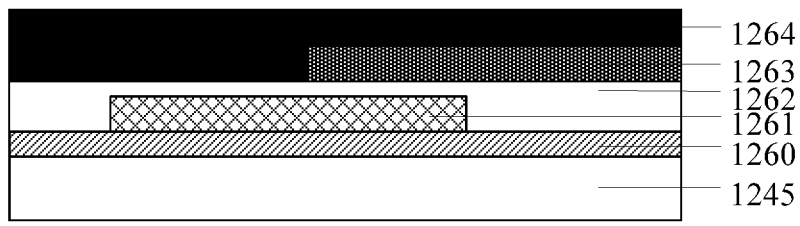
FIG. 17 is a schematic view of a photoresist coated structure when forming a P-type semiconductor in a PN junction semiconductor, according to an exemplary embodiment of the present disclosure.
Figure 18:
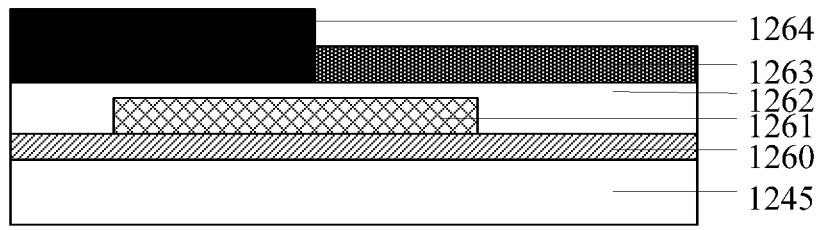
FIG. 18 is a schematic view of an exposed and developed structure when forming a P-type semiconductor in a PN junction semiconductor, according to an exemplary embodiment of the present disclosure.
Figure 19:
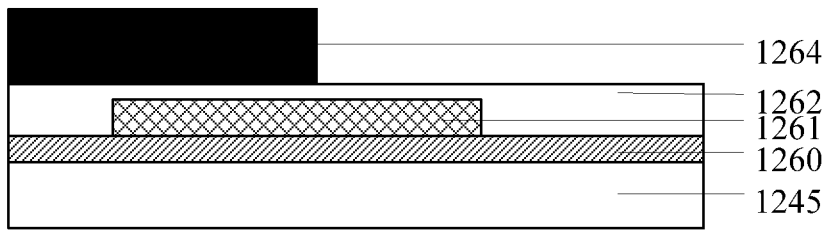
FIG. 19 is a schematic view of an etched structure when forming a P-type semiconductor in a PN junction semiconductor, according to an exemplary embodiment of the present disclosure.
Figure 20:
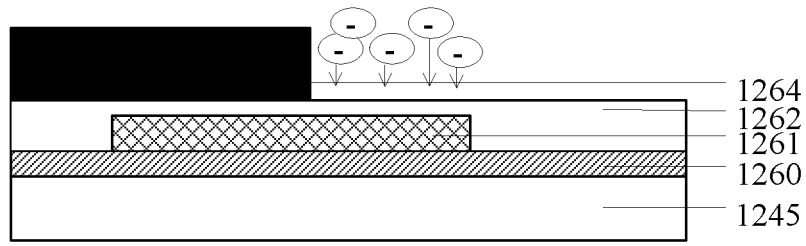
FIG. 20 is a schematic view of a hole-doped structure when forming a P-type semiconductor in a PN junction semiconductor, according to an exemplary embodiment of the present disclosure.
Figure 21:
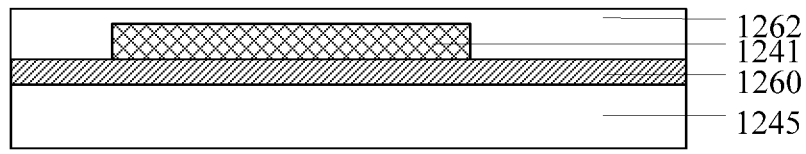
FIG. 21 is a schematic view of a photoresist removed structure when forming a P-type semiconductor in a PN junction semiconductor, according to an exemplary embodiment of the present disclosure.

As shown in FIG. 17, the photoresist 1264 may be further coated on the gate 1263 to cover the hole doping region and the gate 1263; as shown in FIG. 18, the photoresist 1264 may be removed from the gate 1263 by processes like exposure and development so as to form an electron doping region; as shown in FIG. 19, the gate 1263 may be etched from the electron doping region; as shown in FIG. 20, electrons may be injected into the electron doping region by, e.g., boron doping; as shown in FIG. 21, the rest photoresist 1264 may be removed from the gate insulating layer 1262 to form a P-type semiconductor, and finally the polysilicon 1261 may be converted into the PN junction semiconductor 1241.

Figure 22:
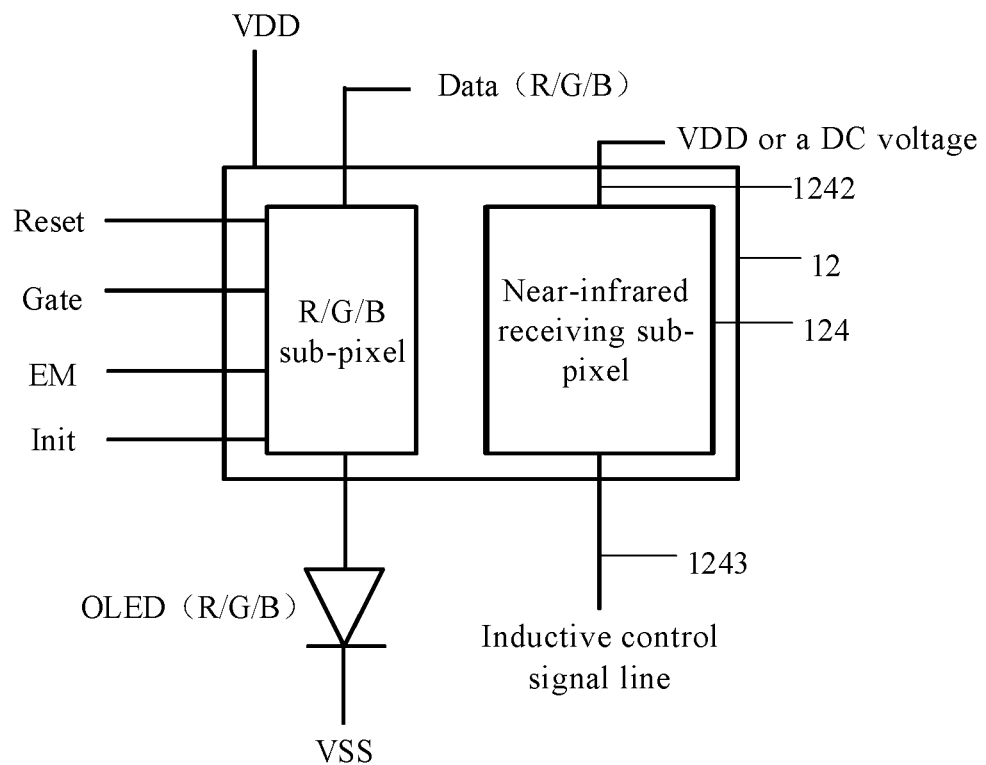
FIG. 22 is a schematic line connection view of a second pixel according to an exemplary embodiment of the present disclosure.

With reference to FIG. 22, it schematically shows the line connection of the second pixel according to an exemplary embodiment of the present disclosure.

As shown in FIG. 22 and with reference to FIG. 3, when the number of the display light-emitting sub-pixels comprised in the second pixel 12 may be three, which are the first sub-pixel 121, the second sub-pixel 122, and the third sub-pixel 123 respectively, the first sub-pixel 121 in the second sub-pixel 12 may be an R sub-pixel, the second sub-pixel 122 in the second sub-pixel 12 may be a G sub-pixel, and the third sub-pixel 123 in the second sub-pixel 12 may be a B sub-pixel. The second pixel 12 further comprises: a reset signal line Reset configured to transmit a reset signal; a gate line Gate configured to transmit a gate line control signal; an initialization signal line Init configured to transmit an initialization signal; a light-emitting control line EM configured to transmit a light-emitting signal; a first voltage signal line VDD configured to transmit a first voltage signal; a second voltage signal line VSS configured to transmit a second voltage signal; and a display data signal line Data (R/G/B) configured to transmit a display data signal for a display light-emitting sub-pixel.

The respective sub-pixel drive circuit 100 of the R sub-pixel, G sub-pixel and B sub-pixel comprises the reset signal terminal reset, a gate line signal terminal gate, the initialization signal terminal init, the voltage signal terminal vdd and the light-emitting control signal terminal em. For the near-infrared receiving sub-pixel 124, it does not have the reset signal terminal reset, the gate line signal terminal gate, the initialization signal terminal init and the light-emitting control signal terminal em, but only needs to be provided with the voltage supply signal line 1242 and the inductive control signal line 1243.

Similarly, for the sub-pixel drive circuit 100 used for each display light-emitting sub-pixel in the second pixel 12, the reset signal terminal reset is connected to the reset signal line Reset, and the gate line signal terminal gate is connected to the gate line Gate, the light-emitting control signal terminal em is connected to the light-emitting control line EM, the initialization signal terminal init is connected to the initialization signal line Init, and the voltage signal terminal vdd is connected to the first voltage signal line VDD. The data signal terminal data of the sub-pixel drive circuit 100 of the display light-emitting sub-pixel is connected to the display data signal line Data (R/G/B), and the output terminal output thereof is connected to the anode of the organic light-emitting diode OLED. The cathode of the organic light-emitting diode OLED is connected to the second voltage signal line VSS.

The voltage supply signal line 1242 of the near-infrared receiving sub-pixel 124 may be directly connected to the first voltage signal line VDD, and may also be connected to the voltage signal terminal vdd of the sub-pixel drive circuit 100 of any one of the R sub-pixel, G sub-pixel and B sub-pixel, so that the reverse voltage may be provided to the PN junction semiconductor 1241 through the first voltage signal line VDD; or, a voltage signal line may be arranged separately so that the separately arranged voltage signal line provides a DC voltage signal so as to provide a reverse voltage to the PN junction semiconductor 1241.

It should be explained that when the voltage supply signal line 1242 is a separately arranged voltage signal line, as shown in FIG. 9, the voltage supply signal line 1242 needs to be connected to the inductive control signal voltage supplier 22 to provide the required DC voltage signal for the voltage supply signal line 1242 by the inductive control signal voltage supplier 22.

Figure 23:
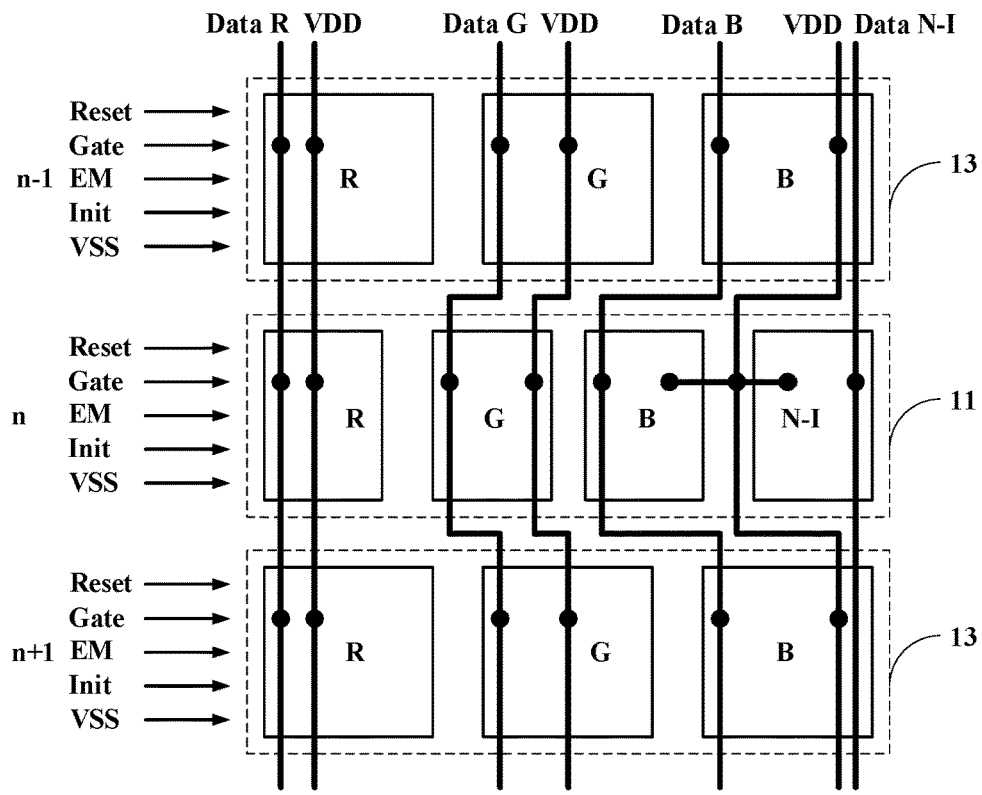
FIG. 23 is a schematic view showing the arrangement structure of the first pixel and a third pixel according to an exemplary embodiment of the present disclosure.
Figure 24:
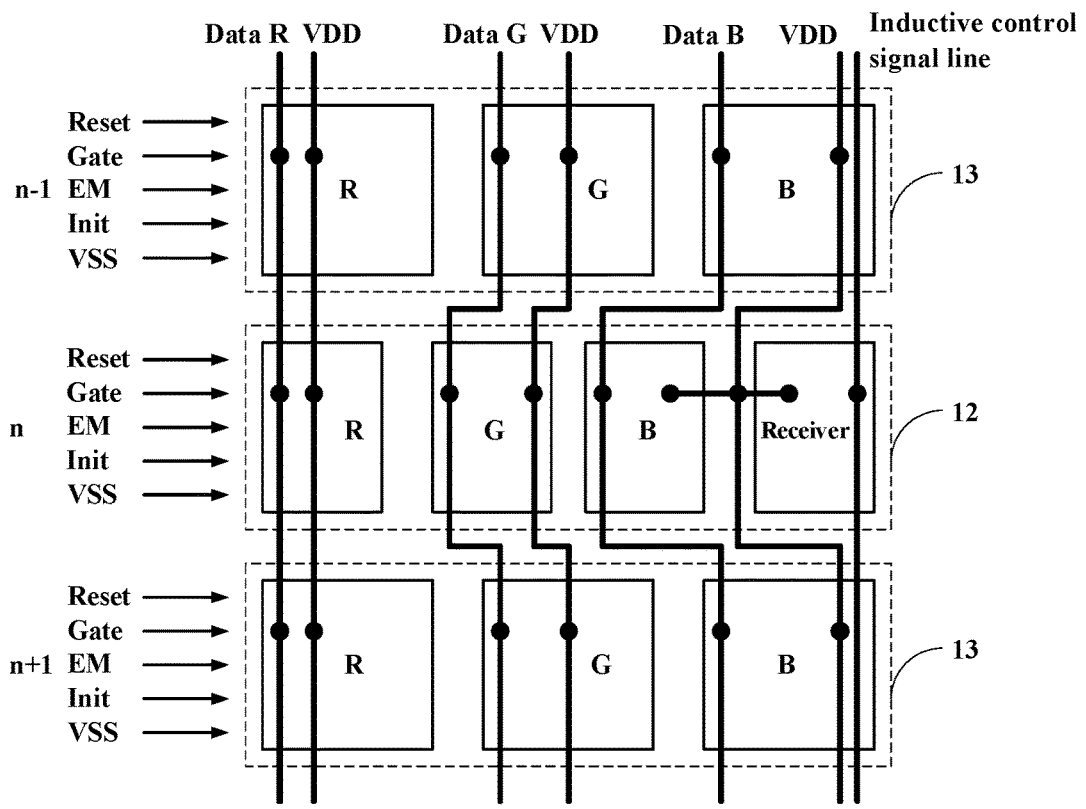
FIG. 24 is a schematic view showing the arrangement structure of the second pixel and the third pixel according to an exemplary embodiment of the present disclosure.

With reference to FIGS. 23 and 24, according to the exemplary embodiment of the present disclosure, the pixel region 10 of the display panel may also comprise a third pixel. The third pixel may comprise only the display light-emitting sub-pixel, but not the near-infrared light-emitting sub-pixel or the near-infrared receiving sub-pixel.

With reference to FIG. 23, it schematically shows an arrangement structure of the first pixel and the third pixel according to the exemplary embodiment of the disclosure, and FIG. 24 schematically shows an arrangement structure of the second pixel and the third pixel according to the exemplary embodiment of the disclosure.

In the exemplary embodiment shown in FIG. 23, each pixel region 10 also comprises a third pixel 13 comprising at least one display light-emitting sub-pixel. The first pixel 11, the second pixel 12 and the third pixel 13 have the same size and each comprises the same number of display light-emitting sub-pixels, so that the spacing between adjacent sub-pixels in the first pixel 11 and that between adjacent sub-pixels in the second pixel 12 are smaller than the spacing between adjacent sub-pixels in the third pixel 13.

For example, the number of the display light-emitting sub-pixels comprised in the third pixel 13 may be three, which are the first sub-pixel, the second sub-pixel and the third sub-pixel respectively, the first sub-pixel in the third pixel 13 may be a R sub-pixel, the second sub-pixel in the third pixel 13 may be a G sub-pixel, and the third sub-pixel in the third pixel 13 may be a B sub-pixel.

The third pixels 13 in FIG. 23 are located in the (n−1)-th row and the (n+1)-th row respectively, the first pixel 11 is located in the n-th row, the third pixel 13 in FIG. 24 is also located in the (n−1)-th row and the (n+1)-th row respectively, and the second pixel 12 is located in the n-th row, wherein n is an integer greater than or equal to two. Each of the pixels respectively comprises a corresponding reset signal line Reset, gate line Gate, initialization signal line Init, light-emitting control line EM, first voltage signal line VDD and second voltage signal line VSS.

The sub-pixel N-I in the first pixel 11 represents a near-infrared light-emitting sub-pixel. It can be seen from FIG. 23 that the near-infrared data signal line Data N-I of the sub-pixel N-I is not shared with the data signal line Data R of the R sub-pixel, the data signal line Data G of the G sub-pixel or the data signal line Data B of the B sub-pixel in the first pixel 11.

The sub-pixel Receiver in the second pixel 12 represents a near-infrared receiving sub-pixel. It can be seen from FIG. 24 that the voltage supply signal line of the sub-pixel Receiver may be the first voltage signal line VDD in the second pixel 12, and the inductive control signal line of the near-infrared receiving sub-pixel needs to be designed separately.

In order to avoid the different in the number of pixels between different rows, the first pixel 11, the second pixel 12 and the third pixel 13 may be arranged to have the same size. Because the near-infrared light-emitting sub-pixel (i.e. sub-pixel N-I) is added in the first pixel 11 and the near-infrared receiving sub-pixel (i.e. sub-pixel Receiver) is added in the second pixel 12, it is necessary to set the spacing between adjacent sub-pixels in the first pixel 11 and the second pixel 12 to be less than the spacing between adjacent sub-pixels in the third pixel 13; and meanwhile, the size of the TFT (thin film transistor) in the near-infrared light-emitting sub-pixel N-I may be appropriately reduced.

Figure 25:
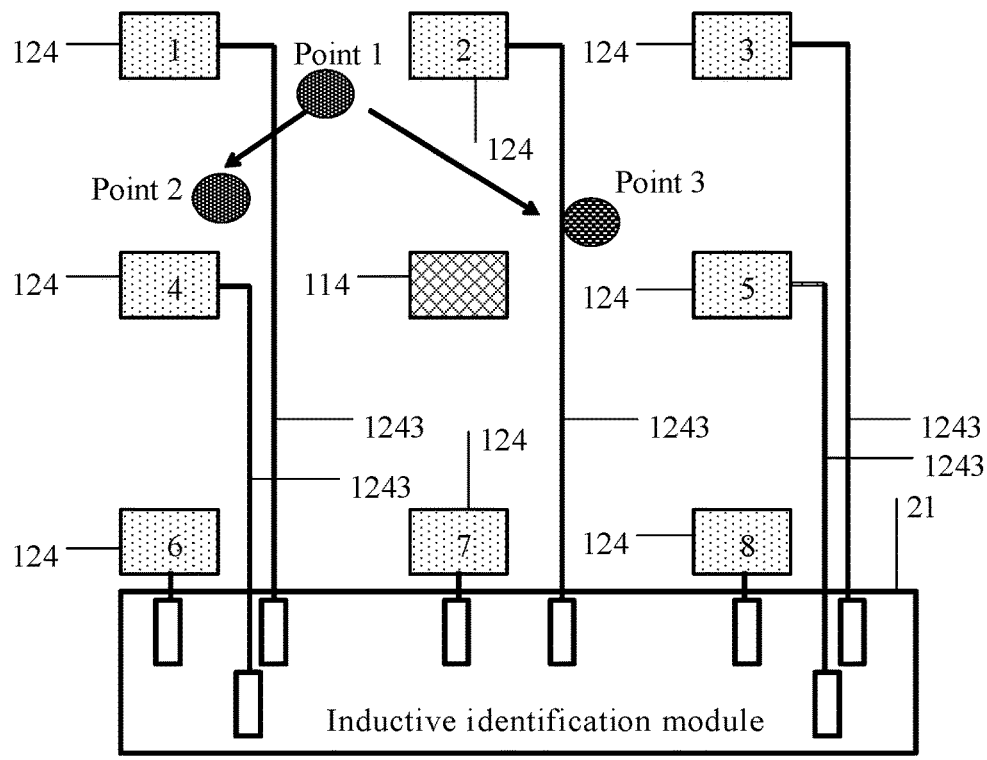
FIG. 25 is a structural schematic view of a display device according to an exemplary embodiment of the present disclosure.

Now with reference to FIG. 25, it schematically shows the structure of a display device according to an exemplary embodiment of the present disclosure. The display device as shown in FIG. 25 may comprise a display panel described with reference to the previous exemplary embodiment.

As shown in FIG. 25, the display device as shown also comprises an inductive control identification module 21. The inductive control identification module 21 is connected with the inductive control signal line 1243 of the near-infrared receiving sub-pixel, and is configured to determine the position of the external object according to the strength of the measurement signal sent by the inductive control signal line 1243.

The principle of detecting the position and movement trajectory of the external object by the display device according to the exemplary embodiment of the present disclosure will be explained as follows by taking the pixel arrangement manner as shown in FIG. 25 for example:

With reference to FIG. 25 and in conjunction to FIGS. 1 to 3, the display panel of the display device as shown may comprise at least one pixel region 10, and each pixel region 10 may comprise one first pixel 11 and eight second pixels 12. To simplify its structural schematic view, only the near-infrared light-emitting sub-pixel 114 in the first pixel 11 and the near-infrared receiving sub-pixel 124 in the second pixel 12 are shown.

The near-infrared light-emitting sub-pixel 114 emits near-infrared light outwards. When there is no external object, the eight near-infrared receiving sub-pixels 124 will not receive the near-infrared light emitted by the near-infrared light-emitting sub-pixel 114. However, when there is an external object approaching the display device, the near-infrared light emitted by the near-infrared light-emitting sub-pixel 114 is reflected by the external object to the near-infrared receiving sub-pixels 124, and the near-infrared receiving sub-pixels 124 generate reverse currents with different intensities according to the intensities of the received near-infrared light, and send the reverse currents to the inductive control identification module 21 through the inductive control signal lines 1243. When the external object gets closer to the display device, the reverse current generated by a near-infrared receiving sub-pixel 124 gets larger, and when the external object gets farther away from the display device, the reverse current generated by a near-infrared receiving sub-pixel 124 gets smaller.

The near-infrared receiving sub-pixel 124 at each vertex and the two adjacent near-infrared receiving sub-pixels 124 may be regarded as a group, for example, the second pixels 12 which are numbered 1, 2 and 4 may be regarded as a group, the second pixels 12 which are numbered 3, 2 and 5 may be regarded as a group, the second pixels 12 which are numbered 6, 4 and 7 may be regarded as a group, and the second pixels 12 which are numbered 8, 5 and 7 may be regarded as a group.

When the external object moves from the position Point 1 to the position Point 2, the intensities of the near-infrared light respectively received by the second pixels 12 which are numbered 1, 2 and 4 in a group will change, so that the generated reverse current will also change. Therefore, the inductive control identification module 21 may determine the movement trajectory of the external object according to the change relationship of the reverse currents sent by the near-infrared receiving sub-pixels 124 of the three second pixels 12; when the external object moves from the position Point 1 to the position Point 3, the near-infrared light which was received by the group composed of the second pixels 12 which are numbered 1, 2 and 4 is changed to be received by the group composed of the second pixels 12 which are numbered 3, 2 and 5. The near-infrared receiving sub-pixels 124 of the second pixels 12 which are numbered 3, 2 and 5 generate different reverse currents according to the intensities of the respectively received near-infrared light, and send them to the inductive control identification module 21. The inductive control identification module 21 may determine the movement trajectory of the external object according to the magnitudes of the reverse currents transmitted by the different near-infrared receiving sub-pixels 124.

Therefore, on the basis of the above-mentioned principles of detecting the position and movement trajectory of an external object, when the external object is a hand or an eyeball, etc., the inductive control interactive function such as gesture induction and eyeball control can be realized accordingly.

In some exemplary embodiments of the present disclosure, the display device may also comprise an amplifier that is respectively connected with the inductive control signal line 1243 and the inductive control identification module 21 of the near-infrared receiving sub-pixel 124, and may be configured to amplify the intensity of the measurement signal transmitted by the inductive control signal line 1243. As a non-limiting example, in order to ensure that the inductive control identification module 21 can receive a stronger current signal, a current amplifier may be arranged between the inductive control signal line 1243 and the inductive control identification module 21 to amplify the reverse current transmitted by the inductive control signal line 1243.

Returning to FIG. 9, in some exemplary embodiments of the present disclosure, the display device may also comprise a drive chip 20, and the inductive control identification module 21 may be integrated into the drive chip 20. The drive chip 20 is mainly used for driving the display of the display device, for example, it may provide driving signals to all the sub-pixels in the first pixel 11 and the third pixel 13, as well as the first sub-pixel 121, the second sub-pixel 122 and the third sub-pixel 123 in the second pixel 12, including the signals to the reset signal line Reset, the gate line Gate, the initialization signal line Init, the first voltage signal line VDD, the second voltage signal line VSS and the light-emitting control line EM of each the pixel.

In some exemplary embodiments of the present disclosure, the display device may also comprise an inductive control signal voltage supplier 22. The inductive control signal voltage supplier 22 may be connected with the voltage supply signal line 1242 of the near-infrared receiving sub-pixel 124, and is configured to provide a reverse voltage to the voltage supply signal line 1242. In this case, as shown in FIG. 9, the voltage supply signal line 1242 may be a separately arranged voltage signal line and be connected to the inductive control signal voltage supplier 22, so that the inductive control signal voltage supplier 22 provides the required DC voltage signal for the voltage supply signal line 1242. Therefore, the inductive control signal voltage supplier 22 may also be arranged on the drive chip 20.

In other exemplary embodiments of the present disclosure, the display device may also comprise a circuit board on which the inductive control identification module 21 and/or the inductive control signal voltage supplier 22 may be arranged. In this case, the display device may also comprise the original drive chip for driving the display of the display device, the manufacturing method of which is relatively simple.

Figure 26:
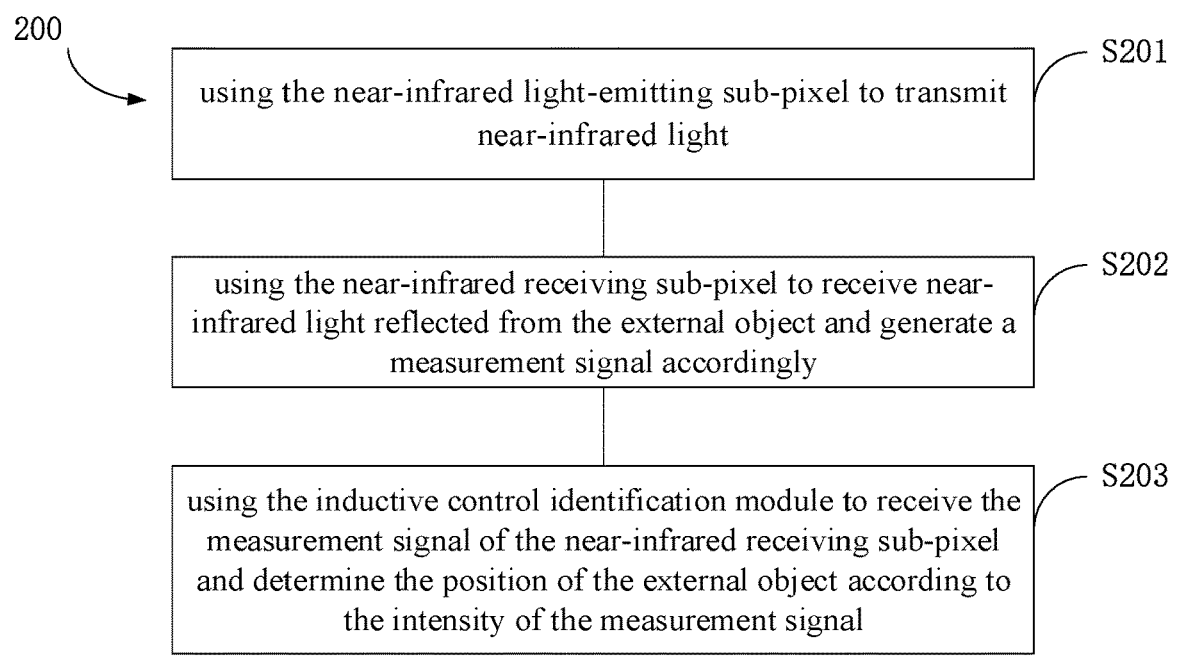
FIG. 26 is a flowchart of a method for determining the position of an external object by the display device according to an exemplary embodiment of the present disclosure.

With reference to FIG. 26, it schematically shows, in the form of a flowchart, a method 200 for determining the position of an external object by the display device according to an exemplary embodiment of the present disclosure.

The method 200 may comprise the steps of:

S201: using the near-infrared light-emitting sub-pixel 114 to transmit near-infrared light;

S202: using the near-infrared receiving sub-pixel 124 to receive near-infrared light reflected from the external object and generate a measurement signal responsive to the external object; and S203: using the inductive control identification module 21 to receive the measurement signal of the near-infrared receiving sub-pixel 124 and determine the position of the external object based on the intensity of the measurement signal.

In the display panel and display device according to the exemplary embodiments of the present disclosure, at least one pixel region is arranged in the display area, such that each pixel region comprises at least one first pixel and at least one second pixel, the first pixel comprises at least one near-infrared light-emitting sub-pixel, the second pixel comprises at least one near-infrared receiving sub-pixel; and the near-infrared light-emitting sub-pixel emits near-infrared light, such that when an external object approaches the display panel, the near-infrared light emitted by the near-infrared light-emitting sub-pixel will be reflected by the external object to the near-infrared receiving sub-pixel, the near-infrared receiving sub-pixel receives the near-infrared light reflected by the external object and generates a reverse current, and sends it to the inductive control identification module, through which the position and the movement trajectory of the external object may be detected. A near-infrared transmitter is integrated into the first pixel of the display panel as the near-infrared light-emitting sub-pixel, and a near-infrared receiver is integrated into the second pixel of the display panel as the near-infrared receiving sub-pixel, such that the position and movement trajectory of an external object can be detected based on the near-infrared light-emitting sub-pixel and the near-infrared receiving sub-pixel, so as to realize inductive control interactive functions such as gesture induction and eyeball control, without taking up extra space.

It should be explained that various exemplary embodiment in the specification of the present disclosure are described in a progressive manner, and each exemplary embodiment focuses on the differences with other exemplary embodiments, so reference can be made between various exemplary embodiments for identical or similar parts.

The above contents are merely the exemplary embodiments of the present disclosure. However, the scope of the present disclosure is not limited thereto. Any one skilled in the art can readily conceive of variations or replacements within the technical scope of the present disclosure. These variations or replacements shall be deemed as falling within the scope of protection of the present disclosure. Thus, the scope of protection of the present disclosure shall be determined based upon the scopes of the appended claims.

What is claimed is:

1. A display panel, comprising at least one pixel region located in a display area, each pixel region comprising:
   at least one first pixel comprising:
   at least one display light-emitting sub-pixel; and
   at least one near-infrared light-emitting sub-pixel;
   wherein the near-infrared light-emitting sub-pixel is configured to emit near-infrared light; and
   at least one second pixel comprising: at least one display light-emitting sub-pixel; and
   at least one near-infrared receiving sub-pixel; wherein the near-infrared receiving sub-pixel is configured to receive near-infrared light reflected from an external object and to generate a measurement signal responsive to the external object;
   wherein the display light-emitting sub-pixel comprises an organic light-emitting diode, and the near-infrared light-emitting sub-pixel comprises a near-infrared organic light-emitting diode;
   wherein the near-infrared organic light-emitting diode comprises: an anode; a hole transport layer; an electron blocking layer; a near-infrared light-emitting layer; a hole blocking layer; an electron transport layer; and a cathode;
   wherein the anode, the hole transport layer, the electron blocking layer, the near-infrared light-emitting layer, the hole blocking layer, the electron transport layer, and the cathode are laminated sequentially;
   wherein the near-infrared receiving sub-pixel comprises: a PN junction semiconductor; a voltage supply signal line; an inductive control signal line; and a light filtering film;
   wherein the N-type semiconductor in the PN junction semiconductor is connected with the voltage supply signal line, the P-type semiconductor in the PN junction semiconductor is connected with the inductive control signal line; the light filtering film is arranged on the side of a light receiving surface of the PN junction semiconductor, and the light filtering film only allows the transmission of near-infrared light;
   wherein the near-infrared receiving sub-pixel further comprises: a buffer layer; a gate insulating layer; an interlayer dielectric layer; a planarization layer; and a pixel defining layer;
   wherein the buffer layer, the gate insulating layer, the interlayer dielectric layer, the planarization layer, and the pixel defining layer are sequentially formed on a substrate; and
   wherein the PN junction semiconductor is formed on the buffer layer, the voltage supply signal line is formed on the interlayer dielectric layer, and the inductive control signal line is formed on the planarization layer.

2. The display panel according to claim 1, wherein:
   the light filtering film is arranged on the light receiving surface of the PN junction semiconductor; and
   a via hole passing through the pixel defining layer, the planarization layer, the interlayer dielectric layer, and the gate insulating layer is formed at a position corresponding to the light filtering film.

3. The display panel according to claim 1, wherein the light filtering film is arranged on the pixel defining layer and an orthographic projection of the light filtering film on the PN junction semiconductor covers the PN junction semiconductor.

4. The display panel according to claim 1, wherein the display light-emitting sub-pixel and the near-infrared light-emitting sub-pixel each comprise a sub-pixel drive circuit comprising:
   a voltage signal terminal configured to receive a voltage signal;
   a gate line signal terminal configured to receive a gate line control signal;
   a light-emitting control signal terminal configured to receive a light-emitting control signal;
   a data signal terminal configured to receive a data signal;
   a reset signal terminal configured to receive a reset signal;
   an initialization signal terminal configured to receive an initialization signal;
   an output terminal configured to output an output signal;
   a first transistor having a control electrode connected with the reset signal terminal, a first electrode connected with the initialization signal terminal, and a second electrode connected with a first node;
   a second transistor having a control electrode connected with the gate line signal terminal, a first electrode connected with the first node, and a second electrode connected with a second node;
   a third transistor having a control electrode connected with the first node, a first electrode connected with a third node, and a second electrode connected with the second node;
   a fourth transistor having a control electrode connected with the gate line signal terminal, a first electrode connected with the data signal terminal, and a second electrode connected with the third node;

a fifth transistor having a control electrode connected with the light-emitting control signal terminal, a first electrode connected with the voltage signal terminal, and a second electrode connected with the third node;
a sixth transistor having a control electrode connected with the light-emitting control signal terminal, a first electrode connected with the second node, and a second electrode connected with the output terminal;
a seventh transistor having a control electrode connected with the reset signal terminal, a first electrode connected with the initialization signal terminal, and a second electrode connected with the output terminal; and
a capacitor having a first electrode connected with the voltage signal terminal, and a second electrode connected with the first node.

5. The display panel according to claim 4, wherein the at least one first pixel comprises:
a reset signal line configured to transmit the reset signal;
a gate line configured to transmit the gate line control signal;
an initialization signal line configured to transmit the initialization signal;
a light-emitting control line configured to transmit the light-emitting control signal;
a first voltage signal line configured to transmit a first voltage signal;
a second voltage signal line configured to transmit a second voltage signal;
a display data signal line configured to transmit a display data signal for the display light-emitting sub-pixel; and
a near-infrared data signal line configured to transmit a near-infrared data signal for the near-infrared light-emitting sub-pixel;
wherein the reset signal terminal is connected to the reset signal line, the gate line signal terminal is connected to the gate line, the light-emitting control signal terminal is connected to the light-emitting control line, the initialization signal terminal is connected to the initialization signal line, and the voltage signal terminal is connected to the first voltage signal line;
wherein the data signal terminal and the output terminal of the sub-pixel drive circuit of the near-infrared light-emitting sub-pixel are respectively connected to the near-infrared data signal line and the anode of the near-infrared organic light-emitting diode;
wherein the data signal terminal and the output terminal of the sub-pixel drive circuit of the display light-emitting sub-pixel are respectively connected to the display data signal line and the anode of the organic light-emitting diode; and
wherein the cathodes of the organic light-emitting diode and the near-infrared organic light-emitting diode are both connected to the second voltage signal line.

6. The display panel according to claim 4, wherein the at least one second pixel comprises:
a reset signal line configured to transmit the reset signal;
a gate line configured to transmit the gate line control signal;
an initialization signal line configured to transmit the initialization signal;
a light-emitting control line configured to transmit the light-emitting control signal;
a first voltage signal line configured to transmit a first voltage signal;
a second voltage signal line configured to transmit a second voltage signal; and
a display data signal line configured to transmit a display data signal for the display light-emitting sub-pixel;
wherein the reset signal terminal is connected to the reset signal line, the gate line signal terminal is connected to the gate line, the light-emitting control signal terminal is connected to the light-emitting control line, the initialization signal terminal is connected to the initialization signal line, and the voltage signal terminal is connected to the first voltage signal line; and
wherein the data signal terminal and the output terminal of the sub-pixel drive circuit of the display light-emitting sub-pixel are respectively connected to the display data signal line and the anode of the the organic light-emitting diode, and the cathode of the organic light-emitting diode is connected to the second voltage signal line.

7. The display panel according to claim 6, wherein the voltage supply signal line is connected with one of the voltage signal terminal of the sub-pixel drive circuit of the display light-emitting sub-pixel of the second pixel and the first voltage signal line.

8. The display panel according to claim 1, wherein:
the number of the first pixels in each pixel region is one;
the number of the second pixels in each pixel region is eight;
the one first pixel and the eight second pixels are arranged in a 3×3 array having first, second, and third rows and first, second, and third columns; and
the first pixel is located at the position where the second row and the second column of the 3×3 array intersect.

9. The display panel according to claim 1, wherein each pixel region further comprises a third pixel, the third pixel comprising:
at least one display light-emitting sub-pixel.

10. The display panel according to claim 9, wherein:
the first pixel, the second pixel, and the third pixel have the same size;
the first pixel, the second pixel, and the third pixel each have the same number of display light-emitting sub-pixels;
a first spacing between adjacent sub-pixels in the first pixel is less than a third spacing between adjacent sub-pixels in the third pixel; and
a second spacing between adjacent sub-pixels in the second pixel is less than the third spacing between adjacent sub-pixels in the third pixel.

11. A display device, comprising a display panel according to claim 1, wherein the display device further comprises:
an inductive control identification module connected with the inductive control signal line of the near-infrared receiving sub-pixel to receive the measurement signal, and wherein the inductive control identification module is configured to determine the position of the external object based on the intensity of the measurement signal.

12. The display device according to claim 11, wherein the display device further comprises:
a drive chip, wherein the inductive control identification module is integrated on the drive chip.

13. The display device according to claim 11, wherein the display device further comprises:
an inductive control signal voltage supplier connected with the voltage supply signal line of the near-infrared receiving sub-pixel, and wherein the inductive control signal voltage supplier is configured to provide a voltage signal to the voltage supply signal line.

14. A method for determining the position of an external object by the display device according to claim 11, comprising the steps of:
- transmitting near-infrared light with the near-infrared light-emitting sub-pixel;
- receiving near-infrared light reflected from the external object with the near-infrared receiving sub-pixel;
- generating a measurement signal responsive to the external object; and
- determining the position of the external object with the inductive control identification module based on the intensity of the measurement signal.

\* \* \* \* \*